(12) United States Patent
Nassi et al.

(10) Patent No.: US 12,445,532 B2
(45) Date of Patent: *Oct. 14, 2025

(54) NETWORK ATTACHED MEMORY USING SELECTIVE RESOURCE MIGRATION

(71) Applicant: Hewlett Packard Enterprise Development LP, Spring, TX (US)

(72) Inventors: Isaac R. Nassi, Los Gatos, CA (US); David P. Reed, Needham, MA (US)

(73) Assignee: Hewlett Packard Enterprise Development LP, Spring, TX (US)

( * ) Notice: Subject to any disclaimer, the term of this patent is extended or adjusted under 35 U.S.C. 154(b) by 189 days.

This patent is subject to a terminal disclaimer.

(21) Appl. No.: 17/545,730

(22) Filed: Dec. 8, 2021

(65) Prior Publication Data

US 2022/0174130 A1 Jun. 2, 2022

Related U.S. Application Data

(63) Continuation of application No. 15/279,187, filed on Sep. 28, 2016, now Pat. No. 11,240,334.
(Continued)

(51) Int. Cl.
*H04L 67/568* (2022.01)
*G06F 9/455* (2018.01)
(Continued)

(52) U.S. Cl.
CPC ........ *H04L 67/568* (2022.05); *G06F 9/45558* (2013.01); *G06F 12/0815* (2013.01);
(Continued)

(58) Field of Classification Search
CPC ... H04L 67/568; H04L 67/10; H04L 67/1097; H04L 67/2885; G06F 9/45558; G06F 2009/45583; G06F 12/0815
See application file for complete search history.

(56) References Cited

U.S. PATENT DOCUMENTS 5,055,999 A 10/1991 Frank
5,109,486 A 4/1992 Seymour
(Continued)

FOREIGN PATENT DOCUMENTS

CN 1577294 2/2005
EP 0322117 1/2001
(Continued)

OTHER PUBLICATIONS

Aho et al., "Principles of Optimal Page Replacement", from the Journal of the Association for Computing Machinery, vol. 18, No. 1, Jan. 1971.
(Continued)

*Primary Examiner* — Tonia L Dollinger
(74) *Attorney, Agent, or Firm* — Yao Legal Services, Inc.

(57) ABSTRACT

Maintaining cache coherency in the presence of a network attached memory is disclosed. A computer system includes a plurality of physical nodes. An operating system is run collectively across the plurality of physical nodes. The physical nodes are configured to communicate with a network attached memory. Based at least in part on an operation to be performed with respect to page on a first physical node included in the plurality of physical nodes, the network attached memory is configured to receive a message. The network attached memory is configured to perform an action based at least in part on the received message.

17 Claims, 19 Drawing Sheets

Related U.S. Application Data

(60) Provisional application No. 62/236,076, filed on Oct. 1, 2015.

(51) Int. Cl.
*G06F 12/0815* (2016.01)
*H04L 67/10* (2022.01)
*H04L 67/1097* (2022.01)
*H04L 67/2885* (2022.01)

(52) U.S. Cl.
CPC .......... *H04L 67/10* (2013.01); *H04L 67/1097* (2013.01); *H04L 67/2885* (2013.01); *G06F 2009/45583* (2013.01)

(56) References Cited

U.S. PATENT DOCUMENTS

| | | | |
|---|---|---|---|
| 5,230,069 A | 7/1993 | Brelsford et al. | |
| 5,247,673 A | 9/1993 | Costa | |
| 5,745,778 A | 4/1998 | Alfieri | |
| 5,991,893 A | 11/1999 | Snider | |
| 6,016,542 A | 1/2000 | Gottleib et al. | |
| 6,026,472 A | 2/2000 | James et al. | |
| 6,035,378 A | 3/2000 | James | |
| 6,105,053 A | 8/2000 | Kimmel et al. | |
| 6,247,109 B1 | 6/2001 | Kleinsorge et al. | |
| 6,266,745 B1 | 7/2001 | De et al. | |
| 6,336,170 B1 | 1/2002 | Dean et al. | |
| 6,601,083 B1 | 7/2003 | Reznak | |
| 6,625,709 B2 | 9/2003 | Aiken et al. | |
| 6,658,447 B2 | 12/2003 | Cota-Robles | |
| 6,748,593 B1 | 6/2004 | Brenner et al. | |
| 6,799,202 B1 | 9/2004 | Hankinson | |
| 6,804,766 B1 | 10/2004 | Noel | |
| 6,807,616 B1 | 10/2004 | McGrath et al. | |
| 6,823,472 B1 | 11/2004 | Dekoning et al. | |
| 7,222,221 B1 | 5/2007 | Agesen et al. | |
| 7,308,498 B1 | 12/2007 | Olsen et al. | |
| 7,328,371 B1 | 2/2008 | Kalyanasundharam et al. | |
| 7,596,654 B1 | 9/2009 | Wong | |
| 7,613,882 B1 | 11/2009 | Akkawi | |
| 7,685,391 B1 | 3/2010 | Cholleti et al. | |
| 7,711,789 B1 | 5/2010 | Jnagal | |
| 7,715,400 B1 | 5/2010 | Krakirian | |
| 7,782,869 B1 | 8/2010 | Chitlur Srinivasa | |
| 7,783,788 B1 | 8/2010 | Quinn | |
| 7,797,375 B2 | 9/2010 | Vincent | |
| 7,802,073 B1 | 9/2010 | Cheng | |
| 7,844,709 B2 | 11/2010 | Aman et al. | |
| 7,852,786 B2 | 12/2010 | Wang et al. | |
| 7,865,895 B2 | 1/2011 | Anand et al. | |
| 7,934,035 B2 | 4/2011 | Miloushev et al. | |
| 8,032,875 B2 | 10/2011 | Kosche et al. | |
| 8,090,914 B2 | 1/2012 | Tierney | |
| 8,156,288 B2 | 4/2012 | Karamcheti et al. | |
| 8,307,191 B1 | 11/2012 | Jain | |
| 8,346,909 B2 | 1/2013 | Dan et al. | |
| 8,413,161 B2 | 4/2013 | Blackburn et al. | |
| 8,423,694 B2 | 4/2013 | Naylor | |
| 8,424,010 B2 | 4/2013 | Stegaru et al. | |
| 8,521,685 B1 | 8/2013 | Chatterjee | |
| 8,544,004 B2 | 9/2013 | Fultheim | |
| 8,547,840 B1 | 10/2013 | Kumar et al. | |
| RE44,610 E | 11/2013 | Krakirian | |
| 8,650,296 B1 | 2/2014 | Herington et al. | |
| RE44,818 E | 3/2014 | Rohit | |
| 8,693,391 B2 | 4/2014 | Garcia-Martin et al. | |
| 8,776,050 B2 | 7/2014 | Plouffe | |
| 8,788,672 B2 | 7/2014 | Heller, Jr. | |
| 8,832,692 B2 | 9/2014 | Fultheim | |
| 9,020,801 B2 | 4/2015 | Fultheim | |
| 9,191,435 B2 | 11/2015 | Nassi | |
| 9,201,689 B2 | 12/2015 | Scott et al. | |
| 9,286,104 B1 | 3/2016 | Ghosh et al. | |
| 9,372,752 B2 | 6/2016 | Das Sharma | |
| 9,552,233 B1 | 1/2017 | Tsirkin et al. | |
| 9,774,401 B1 | 9/2017 | Borrill | |
| 10,187,452 B2 | 1/2019 | Nassi | |
| 10,353,736 B2 | 7/2019 | Nassi et al. | |
| 10,812,408 B1 | 10/2020 | Dhoolam et al. | |
| 10,817,347 B2 | 10/2020 | Nassi et al. | |
| 2001/0056456 A1 | 12/2001 | Cota-Robles | |
| 2002/0087611 A1 | 7/2002 | Tanaka et al. | |
| 2002/0129128 A1 | 9/2002 | Gold | |
| 2002/0166031 A1 | 11/2002 | Chen | |
| 2003/0009641 A1* | 1/2003 | Arimilli ............... G06F 12/0817 711/147 |
| 2003/0037185 A1 | 2/2003 | Davis et al. | |
| 2003/0217234 A1 | 11/2003 | Rowlands | |
| 2004/0151018 A1 | 8/2004 | Chen | |
| 2004/0226026 A1 | 11/2004 | Glass et al. | |
| 2004/0249947 A1 | 12/2004 | Novaes | |
| 2005/0015430 A1 | 1/2005 | Rothman et al. | |
| 2005/0039180 A1 | 2/2005 | Fultheim | |
| 2005/0044301 A1 | 2/2005 | Vasilevsky | |
| 2005/0193169 A1 | 9/2005 | Ahluwalia | |
| 2005/0223382 A1 | 10/2005 | Lippett | |
| 2006/0037017 A1 | 2/2006 | Accapadi et al. | |
| 2006/0136653 A1 | 6/2006 | Traut | |
| 2006/0143350 A1 | 6/2006 | Miloushev et al. | |
| 2006/0242389 A1 | 10/2006 | Browning et al. | |
| 2006/0259818 A1 | 11/2006 | Howell | |
| 2007/0094310 A1 | 4/2007 | Passey | |
| 2007/0186054 A1 | 8/2007 | Kruckemyer | |
| 2007/0226795 A1 | 9/2007 | Conti et al. | |
| 2007/0283125 A1 | 12/2007 | Manczak et al. | |
| 2007/0288718 A1 | 12/2007 | Cholleti et al. | |
| 2007/0288720 A1 | 12/2007 | Cholleti et al. | |
| 2008/0005495 A1 | 1/2008 | Lowe et al. | |
| 2008/0028408 A1 | 1/2008 | Day et al. | |
| 2008/0109876 A1 | 5/2008 | Hitomi et al. | |
| 2008/0270659 A1 | 10/2008 | Grewal et al. | |
| 2009/0037585 A1 | 2/2009 | Miloushev et al. | |
| 2009/0064158 A1 | 3/2009 | Carter | |
| 2009/0138887 A1 | 5/2009 | Uehara et al. | |
| 2009/0172690 A1 | 7/2009 | Zimmer et al. | |
| 2009/0187904 A1 | 7/2009 | Serebrin et al. | |
| 2009/0193122 A1 | 7/2009 | Krishamurthy | |
| 2009/0199177 A1 | 8/2009 | Edwards et al. | |
| 2009/0217276 A1 | 8/2009 | Brenner et al. | |
| 2009/0288087 A1 | 11/2009 | Ringseth et al. | |
| 2009/0320022 A1 | 12/2009 | Ries et al. | |
| 2010/0031254 A1 | 2/2010 | Chin et al. | |
| 2010/0161908 A1 | 6/2010 | Nation | |
| 2010/0235847 A1 | 9/2010 | Brehmer et al. | |
| 2010/0241785 A1 | 9/2010 | Chen | |
| 2011/0004729 A1 | 1/2011 | Akkawi | |
| 2011/0004732 A1 | 1/2011 | Krakirian | |
| 2011/0004733 A1 | 1/2011 | Krakirian | |
| 2011/0010709 A1 | 1/2011 | Anand et al. | |
| 2011/0041131 A1 | 2/2011 | Srivatsa et al. | |
| 2011/0083134 A1 | 4/2011 | Song et al. | |
| 2011/0087822 A1 | 4/2011 | Bennett et al. | |
| 2011/0119422 A1 | 5/2011 | Grouzdev | |
| 2011/0179132 A1 | 7/2011 | Mayo et al. | |
| 2011/0179229 A1 | 7/2011 | Chen | |
| 2011/0191783 A1 | 8/2011 | Le Moal | |
| 2011/0247000 A1 | 10/2011 | Eidus et al. | |
| 2011/0277038 A1 | 11/2011 | Sahita et al. | |
| 2011/0296406 A1 | 12/2011 | Bhandari et al. | |
| 2012/0020370 A1 | 1/2012 | Sonnier et al. | |
| 2012/0023311 A1 | 1/2012 | Yamamoto et al. | |
| 2012/0054762 A1 | 3/2012 | Moon et al. | |
| 2012/0079232 A1 | 3/2012 | Hinton et al. | |
| 2012/0096462 A1 | 4/2012 | Kim | |
| 2012/0117299 A1 | 5/2012 | Waldspurger et al. | |
| 2012/0174097 A1 | 7/2012 | Levin | |
| 2012/0185866 A1 | 7/2012 | Couvee et al. | |
| 2012/0215990 A1 | 8/2012 | Li et al. | |
| 2012/0239825 A1 | 9/2012 | Xia | |
| 2012/0272029 A1 | 10/2012 | Zhang et al. | |
| 2012/0297163 A1 | 11/2012 | Breternitz et al. | |
| 2012/0303799 A1 | 11/2012 | Hadas et al. | |

(56) References Cited

U.S. PATENT DOCUMENTS

| | | |
|---|---|---|
| 2013/0097613 A1 | 4/2013 | Shin et al. |
| 2013/0159997 A1 | 6/2013 | Cawlfield et al. |
| 2013/0167146 A1 | 6/2013 | Dong et al. |
| 2013/0173806 A1 | 7/2013 | Newton et al. |
| 2013/0179897 A1 | 7/2013 | Archer et al. |
| 2013/0263138 A1 | 10/2013 | Aho et al. |
| 2013/0332778 A1 | 12/2013 | Spracklen |
| 2014/0059110 A1 | 2/2014 | Nassi |
| 2014/0059543 A1 | 2/2014 | Nassi |
| 2014/0081918 A1 | 3/2014 | Srivas et al. |
| 2014/0082145 A1 | 3/2014 | Lacapra |
| 2014/0115601 A1 | 4/2014 | Suzuki et al. |
| 2014/0201421 A1 | 7/2014 | Schoenberg |
| 2014/0201477 A1 | 7/2014 | Greenfield et al. |
| 2014/0237192 A1 | 8/2014 | Liu et al. |
| 2014/0244891 A1 | 8/2014 | Tsirkin |
| 2014/0245294 A1 | 8/2014 | Kaul |
| 2014/0245295 A1 | 8/2014 | Tsirkin et al. |
| 2014/0245304 A1 | 8/2014 | Zheng et al. |
| 2014/0245444 A1 | 8/2014 | Lutas et al. |
| 2014/0337393 A1 | 11/2014 | Burchall |
| 2015/0013008 A1 | 1/2015 | Lukacs et al. |
| 2015/0033228 A1 | 1/2015 | Lee et al. |
| 2015/0052287 A1 | 2/2015 | Venkatasubramanian et al. |
| 2015/0058863 A1 | 2/2015 | Karamanolis |
| 2015/0127895 A1 | 5/2015 | Malwankar |
| 2015/0161048 A1 | 6/2015 | Patil |
| 2015/0277908 A1 | 10/2015 | Bradbury et al. |
| 2015/0309830 A1 | 10/2015 | Cawlfield et al. |
| 2015/0356125 A1 | 12/2015 | Golander |
| 2016/0088327 A1 | 3/2016 | Cronk et al. |
| 2016/0127492 A1 | 5/2016 | Malwankar |
| 2016/0269313 A1 | 9/2016 | Brooker et al. |
| 2016/0366183 A1 | 12/2016 | Smith et al. |
| 2017/0031819 A1 | 2/2017 | Venkatasubramanian et al. |
| 2017/0149921 A1 | 5/2017 | Nassi et al. |
| 2017/0249255 A1 | 8/2017 | Edwards et al. |
| 2017/0371561 A1 | 12/2017 | Cai et al. |
| 2018/0060103 A1 | 3/2018 | Tsirkin |
| 2018/0062764 A1 | 3/2018 | Borrill |
| 2018/0150232 A1 | 5/2018 | Tsirkin et al. |
| 2018/0217859 A1 | 8/2018 | Triplett |
| 2019/0370049 A1 | 12/2019 | Gopalan |

FOREIGN PATENT DOCUMENTS

| | | |
|---|---|---|
| GB | 2419701 A | 5/2006 |
| JP | 2004355124 | 12/2004 |
| WO | 2015034506 | 3/2015 |
| WO | 2015034508 | 3/2015 |

OTHER PUBLICATIONS

ALNÆS et al., "Scalable Coherent Interface", Jan. 1990.
Ami Litman, "The DUNIX Distributed Operating System", Jan. 1988.
Amza et al., "TreadMarks: Shared Memory Computing on Networks of Workstations", 1996.
Amza et al., "TreadMarks: Shared Memory Computing on Networks of Workstations", Feb. 1996.
Andrew W. Wilson Jr., "Hierarchical Cache / Bus Architecture for Shared Memory Multiprocessors", 1987.
Andrew Wilkins Wilson Jr., "Organization and Statistical Simulation of Hierarchical Multiprocessors", Department of Electrical and Computer Engineering, Carnegie-Mellon University, Aug. 1985. (part 1 of 4).
Andrew Wilkins Wilson Jr., "Organization and Statistical Simulation of Hierarchical Multiprocessors", Department of Electrical and Computer Engineering, Carnegie-Mellon University, Aug. 1985. (part 2 of 4).
Andrew Wilkins Wilson Jr., "Organization and Statistical Simulation of Hierarchical Multiprocessors", Department of Electrical and Computer Engineering, Carnegie-Mellon University, Aug. 1985. (part 3 of 4).
Andrew Wilkins Wilson Jr., "Organization and Statistical Simulation of Hierarchical Multiprocessors", Department of Electrical and Computer Engineering, Carnegie-Mellon University, Aug. 1985. (part 4 of 4).
Aral et al. Process Control Structures for Multiprocessors. Encore Computer Corporation. IEEE, 1991.
Aral, Ziya et al. "Variable Weight Processes with Flexible Shared Resources ?." (1989).
Assaf Schuster, Resume, Jul. 2017.
Author Unknown, "A research and development strategy for high performance computing", Executive Office of the President, Office of Science and Technology Policy, Nov. 20, 1987.
Author Unknown, "IBM System/360 Model 67: Functional Characteristics", IBM Systems Reference Library, First Edition, 1967.
Author Unknown, "IBM Time Sharing System: Command System User's Guide", IBM Systems Reference Library, Aug. 1976. (1 of 3).
Author Unknown, "IBM Time Sharing System: Command System User's Guide", IBM Systems Reference Library, Aug. 1976. (2 of 3).
Author Unknown, "IBM Time Sharing System: Command System User's Guide", IBM Systems Reference Library, Aug. 1976. (3 of 3).
Author Unknown, "Last Transaction Safety on MongoDB with-out compromising on Performance", downloaded from http://www.plexistor.com/wp-content/uploads/2016/02/Last_Transaction_Safety_On_MongoDB_WP_Long.pdf, Feb. 2016.
Author Unknown, "Multimax Technical Summary", Encore Computer Corporation, May 1985.
Author Unknown, "System/360 Model 67: Time Sharing System Preliminary Technical Summary", IBM Systems Reference Library, 1966.
Author Unknown, Technical Summary, Kendall Square Research, 1992.
Author Unknown. Features—multicians.org/features.html. Multics Software Features. Jul. 21, 2012.
Barak et al., "MOS: A Multicomputer Distributed Operating System", The Hebrew University of Jerusalem, Software—Practice and Experience, vol. 15(8), 725-737, Aug. 1985.
Beck et al. Harness: a next generation distributed virtual machine. Future Generation Computer Systems 15 (1999). pp. 571-582.
Bell et al., "The Encore Continuum: a complete distributed work station—multiprocessor computing environment", National Computer Conference, 1985.
Bendtsen et al. Experience With the KSR-1 Parallel Computer. Jul. 1996.
Bensoussan et al. The Multics Virtual Memory: Concepts and Design. Association for Computing Machinery, Inc., 1972.
Bilas et al., "Shared virtual memory clusters: bridging the cost-performance gap between SMPs and hardware DSM systems", Journal of Parallel and Distributed Computing, Oct. 19, 2001.
Blakeney et al. An Application-Oriented Multiprocessing System: II Design Characteristics of the 9020 System. IBM Systems Journal, vol. 6, No. 2. 1967, part 2.
Boykin et al. Programming under Mach. UNIX and Open Systems Series. pp. 63-97.Copyright (c) 1993 by Addison-Wesley Publishing Company, Inc. 1993.
Breit et al. Technical Applications on the KSR1: High Performance and Ease of Use. IEEE, 1993.
Bugnion et al., "Disco: Running Commodity Operating Systems on Scalable Multiprocessors", Computer Systems Laboratory, Stanford University, 1997.
Büttner et al., "ARTS of PEACE—A High-Performance Middleware Layer for Parallel Distributed Computing", Mar. 31, 1995.
Buyya et al., "Single System Image (SSI)", The International Journal of High Performance Computing Applications, vol. 15, No. 2, 2001.
Buzen et al., "The evolution of virtual machine architecture", Honeywell Information Systems, Inc. and Harvard University, National Computer Conference, 1973.

(56) References Cited

OTHER PUBLICATIONS

C. Gordon Bell, "Multis: A New Class of Multiprocessor Computers", Science, vol. 228, pp. 462-467, Apr. 26, 1985.
Carl J. Young. Extended Architecture and Hypervisor Performance. IBM VM/370 Development Group. Published in: Proceedings of the workshop on virtual computer systems. pp. 177-183 Cambridge, Massachusetts, USA—Mar. 26-27, 197. ACM New York, NY, USA © 1973.
Chapman et al., "vNUMA: A Virtual Shared-Memory Multiprocessor", 2009.
Chen et al., "A Transparent Remote Paging Model for Vitual Machines", Department of Computer Science and Technology at Peking University, and Department of Computer Science at Michigan Technological University, 2008.
Chen et al., "When Virtual Is Better Than Real", 2001.
Chester Gordon Bell. Three Decades of Multiprocessors. Feb. 1991.
Chester Gordon Bell. Darpa Proposal: Encore Computer Corporation Research and Development in High Performance and Fail Soft Multiprocessors for Parallelism; and Systolic Array Processors for Signal Processing. Mar. 10, 1984.
Chris Mellor, "Flexi-Plexistor's software-defined memory roadmap", Apr. 25, 2016.
Chris Mellor, "Plexistor rolls out storage-defined memory for the masses", Jan. 27, 2016.
Chris Mellor, "Plexistor's latest box sounds a lot like flash memory as virtual DRAM", Jul. 27, 2015.
Cisternino et al. "Using NVMe Flash as DRAM Expansion for TPC-C workload with ScaleMP vSMP Foundation FLX" Technical Report. Universita Di Pisa. Jul. 28, 2016.
Corbató et al., "Introduction and Overview of the Multics System", 1965.
Corbató et al., "Multics—The first seven years", Spring Joint Computer Conference, 1972.
Dave Taylor. Distributed Operating Systems—An Overview of Current Research. Jun. 13, 1998.
David B. Gustavson, "Applications for the Scalable Coherent Interface", Stanford Linear Accelerator Center, Apr. 1990.
David B. Gustavson. [RPRWG] Dave James. Jan. 18, 2008.
David J. Schanin. The Design and Development of a Very High Speed System Bus—The Encore Multimax Nanobus. IEEE, 1986.
Edmnd Burke. An Overview of System Software for the KSR1. Kendall Square Research Corporation, Waltham, MA. IEEE. 1993.
Ehab S. Al-Shaer, Distributed Memory Management: Design Issues and Future Trends, Mar. 19, 1993.
Einar Rustad, "numascale: NumaConnect", Sep. 2013.
Elizabeth Corcoran, "Strategic computing: a status report", Apr. 1987.
Feeley et al., "Implementing Global Memory Management in a Workstation Cluster", Department of Computer Science and Engineering at University of Washington, and Chandramohan A. Thekkath DEC Systems Research Center, Dec. 1995.
Fleisch et al., Mirage: A Coherent Distributed Shared Memory Design, ACM, 1989, pp. 211-223.
Frank et al. The KSR1: Bridging the Gap Between Shared Memory and MPPs. IEEE, 1993.
Fraser et al. 3Leaf Virtual Server Software Architecture. Copyright (c) 2004 3Leaf Networks.
Fu et al., "Distributed shared arrays: A distributed virtual machine with mobility support for reconfiguration", Wayne State University, Sep. 1, 2003.
Gabriel Southern. Analysis of SMP VM CPU Scheduling. George Mason University. 2008.
Gardner Hendrie, "Oral History of Gordon Bell", Computer History Museum, Jun. 23, 2005.
Gertner et al., "Symmetric Parallel Processing", 1990.
Ghormley et al., "GLUnix: a Global Layer Unix for a Network of Workstations", University of California at Berkeley, Aug. 14, 1997.
Giloi W.K., Hastedt C., Schoen F., Schroeder-Preikschat W. (1991) A distributed implementation of shared virtual memory with strong and weak coherence. In: Bode A. (eds) Distributed Memory Computing. EDMCC 1991. Lecture Notes in Computer Science, vol. 487. Springer, Berlin, Heidelberg.
Golander et al., Storage Industry Summit: Convergence of Storage and Memory Developing the Needed Ecosystem, NVDIMM Panel, Jan. 20, 2016.
Goodman et al. Scalability and Its Application to Multicube. Computer Sciences Technical Report #835. Mar. 1989.
Gordon Bell, "Scalable, Parallel Computers: Alternatives, Issues, and Challenges", International Journal of Parallel Programming, vol. 22, No. 1, 1994.
Govil et al., "Cellular Disco: resource management using virtual clusters on shared-memory multiprocessors", 17th ACM Symposium on Operating Systems Principles, Dec. 1999.
Gregory F. Pfister, "An Introduction to the InfiniBand Architecture", 2001.
Gregory F. Pfister. In Search of Clusters The Ongoing Battle in Lowly Parallel Computing. Chapters. 6-7, 11, 12.11.4.2, 13. Second Edition. (c) 1998 Prentice Hall PTR. 1998 (part 1 of 3).
Gregory F. Pfister. In Search of Clusters The Ongoing Battle in Lowly Parallel Computing. Chapters. 6-7, 11, 12.11.4.2, 13. Second Edition. (c) 1998 Prentice Hall PTR. 1998 (part 2 of 3).
Gregory F. Pfister. In Search of Clusters The Ongoing Battle in Lowly Parallel Computing. Chapters. 6-7, 11, 12.11.4.2, 13. Second Edition. (c) 1998 Prentice Hall PTR. 1998 (part 3 of 3).
Gregory Pfister, "Aspects of the InfiniBand Architecture", IBM Server Technology & Architecture, Austin, TX, Oct. 11, 2001.
Healy et al. Single System Image: A Survey. Article in Journal of Parallel and Distributed Computing. Feb. 2016.
History of IBM Mainframe Operating Systems. From Wikipedia, the free encyclopedia. https://web.archive.org/web/20120622012058/ https://en.wikipedia.org/wiki/History_of_IBM_mainframe_operating_systems. Jun. 22, 2012.
Holley et al., "VM/370 asymmetric multiprocessing", IBM Systems Journal, vol. 18, No. 1, 1979.
Hu et al. The Memory and Communication Subsystem of Virtual Machines for Cluster Computing. Jan. 2002.
Hudzia et al., "Memory Aggregation For KVM", Hecatonchire Project, Nov. 2012.
Hwang et al. Distributed and Cloud Computing From Parallel Processing to the Internet of Things. Oct. 17, 2011.
Intel. Intel 64 and IA-32 Architectures Software Developer's Manual, May 2019.
Intel. White Paper—System Memory at a Fraction of the DRAM Cost. "Software-Defined Memory for SCM". retrieved from archive. com on Sep. 20, 2016.
Ion Stoica. Virtual Machines Disco and Xen (Lecture 10, cs262a). UC Berkeley, Sep. 28, 2016.
J. F. Keeley. An Application-Oriented Multiprocessing System: I Introduction. IBM Systems Journal, vol. 6, No. 2. 1967, part 1.
Janjua et al. CEJVM: "Cluster Enabled Java Virtual Machine". Faculty of Computer Science & Engineering, GIK Institute, Topi, Pakistan. IEEE, Sep. 2002.
Jeff Dike. User Mode Linux. Bruce Peren's Open Source Series. Chapter 12. Copyright (c) 2006 Pearson Education, Inc. Apr. 2006.
Jeff Dike. UML Clustering. Sep. 14, 2001.
Jiang et al., "SODA: a Service-On-Demand Architecture for Application Service Hosting Utility Platforms", Proceedings of the 12th IEEE International Symposium on High Performance Distributed Computing (HPDC'03), 2003.
Jim Elliot. IBM Mainframes—45+ Years of Evolution. (c) 2010 IBM Corporation. 2010.
Juhász et al., "Distributed and Parallel Systems: Cluster and Grid Computing", the Kluwer international series in engineering and computer science, 2005.
Konthothanassis et al., "VM-Based Shared Memory on Low-Latency, Remote-Memory-Access Networks", Nov. 1996.
Kai Hwang. Advanced Computer Architecture: Parallelism, Scalability, Programmability. Chapter 7. Copyright (c) 1993 McGraw-Hill, Inc.
Kaneda et al. A Virtual Machine Monitor for Providing a Single System Image. 2006.
King et al., "Operating System Support for Virtual Machines", Proceedings of the 2003 USENIX Technical Conference, 2003.

(56) References Cited

OTHER PUBLICATIONS

Kronenberg et al., "VAXclusters: A Closely-Coupled Distributed System", ACM Transactions on Computer Systems, vol. 4, No. 2, pp. 130-146, May 1986.
Lenoski et al. The Stanford Dash Multiprocessor. IEEE, Mar. 1992.
Li et al., "Memory Coherence in Shared Virtual Memory Systems", ACM Transactions on Computer Systems, vol. 7, No. 4, pp. 321-359, Nov. 1989.
Li et al., "Memory Coherence in Shared Virtual Memory Systems", Distributed Information Processing, 2014.
Li et al., "Memory Coherence in Shared Virtual Memory Systems", Yale University, 1986.
Liu et al., "Design and Implementation of a Single System Image Operating System for Ad Hoc Networks", Department of Computer Science, Cornell University, Jun. 2005.
Ma et al., "JESSICA: Java-Enable Single-System-Image Computing Architecture", The University of Hong Kong, Oct. 2000.
Maurice Herlihy. Wait-Free Synchronization. ACM Transactions on Programming Languages and Systems, vol. 11, No. 1. pp. 124-149. Jan. 1991.
Michael James Carlton, "Multiple-Bus, Scaleable, Shared-Memory Multiprocessors", University of California at Berkeley, 1995.
Michael T. Alexander, "Organization and features of the Michigan terminal system", Spring Joint Computer Conference, 1972.
Nitzberg et al., Distributed Shared Memory: A Survey of Issues and Algorithms, 1991 IEEE, 1991.
Oracle. Oracle Buys Virtual Iron—Adds advanced virtualization management technology to enhance Oracle VM. Jun. 15, 2009.
Osisek et al. ESA/390 Interpretive-Execution Architecture, Foundation for VM/ESA. IBM Systems Journal, vol. 30, No. 1. Feb. 1991.
Ossanna et al. Communications and Input/Output Switching in a Multiplex Computing System. Fall Joint Computer Conference, 1965.
Peng et al. DVMM: a Distributed VMM for Supporting Single System Image on Clusters. The 9th international Conference for Young Computer Scientists. IEEE, 2008.
Pete Keleher, "CVM: The Coherent Virtual Machine", University of Maryland, Aug. 1, 1998.
Peter J. Denning. The Working Set Model for Program Behavior. Massachusetts Institute of Technology, Cambridge, Massachusetts. Communications of the ACM. vol. 11, No. 5. May 1968.
Pieter J. Muller, "An Environment for Distributed Programming on a Multicomputer", a thesis submitted to the department of computer science of the University of Stellenbosch in partial fulfillment of the requirements for the degree of master of science, Feb. 1994.
Pinkston et al., "InfiniBand: The 'De Facto' Future Standard for System and Local Area Networks or Just a Scalable Replacement for PCI Buses?", Cluster Computing 6, pp. 95-104, 2003.
Popek and Goldberg Virtualization Requirements. From Wikipedia, the free encyclopedia. https://en.wikipedia.org/wiki/Popek_and_Goldberg_virtualization_requirements. Jun. 22, 2012.
Popek et al. Formal Requirements for Virtualizable Third Generation Architectures. Communications of the ACM, vol. 17, No. 7. Jul. 1974.
Popek, Gerald J. et al. "LOCUS—A Network Transparent, High Reliability Distributed System." SOSP (1981).
Protić et al., "A Survey of Distributed Shared Memory Systems", Proceedings of the 28th Annual Hawaii International Conference on System Sciences, 1995.
Protić et al., "Distributed Shared Memory: Concepts and Systems", University of Belgrade, 1996.
R. A. MacKinnon, "The changing virtual machine environment: Interfaces to real hardware, virtual hardware, and other virtual machines", 1979.
R. J. Creasy. The Origin of the VM/370 Time-Sharing System. IBM J. Res. Develop. vol. 25, No. 5. Sep. 1981.
Rajkumar Buyya, "PARMON: a portable and scalable monitoring system for clusters", Monash University, 2000.
Ramachandran et al. Scalability Study of the KSR-1—Appeared in Parallel Computing, vol. 22, pp. 739-759. 1996.
Reports Leading to the National High Performance Computing Program: "A Research and Development Strategy for High Performance Computing", Nov. 1987; "The U.S. Supercomputer Industry," Dec. 1987; "The Federal High Performance Computing Program", Sep. 1989; "High Performance Computing and Communication: Investment in American Competitiveness", ("Gartner Report"), Mar. 1991. (part 1 of 3).
Reports Leading to the National High Performance Computing Program: "A Research and Development Strategy for High Performance Computing", Nov. 1987; "The U.S. Supercomputer Industry," Dec. 1987; "The Federal High Performance Computing Program", Sep. 1989; "High Performance Computing and Communication: Investment in American Competitiveness", ("Gartner Report"), Mar. 1991. (part 2 of 3).
Reports Leading to the National High Performance Computing Program: "A Research and Development Strategy for High Performance Computing", Nov. 1987; "The U.S. Supercomputer Industry," Dec. 1987; "The Federal High Performance Computing Program", Sep. 1989; "High Performance Computing and Communication: Investment in American Competitiveness", ("Gartner Report"), Mar. 1991. (part 3 of 3).
Rich Oehler, "Ideas for a Dependable 'Industry Standard Architecture' Platform", Newisys, Inc., Jan. 27, 2005.
Richard A. Jenkins, "New Approaches in Parallel Computing", Computers in Physics, 1989.
Robert P. Goldberg. Survey of Virtual Machine Research. Honeywell Information Systems and Harvard University. Jun. 1974.
Robert P. Goldberg. Survey of Virtual Machine Research (2). Honeywell Information Systems and Harvard University. Jun. 1974.
Robin Bloor. "ScaleMP—The Dawn of the Virtualized Data Center". The Bloor Group—Product Watch. Sep. 16, 2013.
Roland et al. Strategic Computing—Darpa and the Quest for Machine Intelligence, 1983-1993. Chapter 5 and Chapter 9. (c)2002 Massachusetts Institute of Technology. 2002.
Rudolph et al., "Dynamic Decentralized Cache Schemes for MIMD Parallel Processors", Carnegie-Mellon University, 1984.
ScaleMP. ScaleMP's Software-Defined Memory for NVME and Intel Optane Technology to be Presented at Intel Developer Forum. Aug. 16, 2016.
ScaleMP. System Memory at a Fraction of the DRAM Cost. Software-Defined Memory for SCM. retrieved from archive.org on May 8, 2016.
ScaleMP. vSMP Foundation for Flash Expansion. May 2016.
ScaleMP. vSMP Foundation for Memory Expansion. May 2016.
Scales et al., "Towards Transparent and Efficient Software Distributed Shared Memory", Oct. 1997.
Scott Lurndal. 3LeafVirtual Server—Low-Level Architectural Design. May 9, 2018.
Sirer et al. Distributed Virtual Machines: A System Architecture for Network Computing. Dept. of Computer Science & Engineering, University of Washington. 1998.
Southern et al. FPGA Implementation of High Throughput Circuit for Trial Division by Small Primes. George Mason University. 2007.
Brodawa et al., "An efficient virtual machine implementation", Wayne State University, National Computer Conference, 1973.
Steier et al. Mind Matters—A Tribute to Allen Newell. Chapter 6. Copyright (c) 1996 by Lawrence Associates, Inc. 1996.
Tanenbaum et al., Distributed Systems: Principles and Paradigms, 2002, pp. 28-32, Prentice-Hall, Inc.
Tanenbaum et al., Distributed Systems: Principles and Paradigms, Oct. 20, 2003, 1st Edition, pp. 28-32, Pearson Education Ltd.
Tetzlaff et al., "VM/370, Attached Processor, and multiprocessor performance study", IBM Systems Journal, vol. 23, No. 4, 1984.
Tod Newcombe, "Public-Sector Multiprocessing Emerges", Nov. 30, 1995.
USENIX Association. Proceedings of the 5th Annual Linux Showcase & Conference. Oakland, CA. Nov. 5-10, 2001.
Vasilevsky et al., "LINUX Virtualization on Virtual Iron VFe", Virtual Iron Software, Inc., 2005.
VM (operating system). From Wikipedia, the fee encyclopedia. https://en.wikipedia.org/wiki/VM_(operating_system). Jun. 22, 2012.

(56) References Cited

OTHER PUBLICATIONS

Walker et al. The LOCUS Distributed Operating System. ACM, 1983.
Walker et al. The LOCUS Distributed Operating System. Presentation, 1983.
Walker, Bruce J. and Douglas Steel. "Implementing a Full Single System Image UnixWare Cluster: Middleware vs Underware." PDPTA (1999).
Wang et al. NEX: Virtual Machine Monitor Level Single System Support in Xen. 2009 First International Workshop on Education Technology and Computer Science. IEEE, 2009.
Whitaker et al. Scale and Performance in the Denali Isolation Kernel. USENIX Association 5th Symposium on Operating Systems Design and Implementation. Dec. 2002.
Woodbury et al., "Shared Memory Multiprocessors: The Right Approach to Parallel Processing", Encore Computer Corporation, IEEE, 1989.
Yeo C.S., Buyya R., Pourreza H., Eskicioglu R., Graham P., Sommers F. (2006) Cluster Computing: High-Performance, High-Availability, and High-Throughput Processing on a Network of Computers. In: Zomaya A.Y. (eds) Handbook of Nature-Inspired and Innovative Computing. Springer, Boston, MA. 2006.
Younge et al. Evaluation of SMP Shared Memory Machines for Use With In-Memory and OpenMP Big Data Applications. 2016 IEEE International Parallel and Distributed Processing Symposium Workshops. 2016.
Zhu et al., "JESSICA2: A Distributed Java Virtual Machine with Transparent Thread Migration Support", The University of Hong Kong, 2002.
Bell et al., "DSM Perspective: Another Point of View", Proceedings of the IEEE, vol. 87, No. 3, Mar. 1999.
Dean et al., "MapReduce: Simplified Data Processing on Large Clusters", USENIX Association, OSDI '04: 6th Symposium on Operating Systems Design and Implementation, pp. 137-149, 2004.
Ike Nassi, "Scaling the Computer to the Problem: Application Programming with Unlimited Memory", Cover Feature Computer Design Starts Over, Aug. 2017.
International Search Report and Written Opinion received for PCT Patent Application No. PCT/US17/48903, mailed on Jan. 2, 2018, 11 pages.
International Search Report and Written Opinion received for PCT Patent Application No. PCT/US18/39835, mailed on Oct. 30, 2018, 8 pages.
International Search Report and Written Opinion received for PCT Patent Application No. PCT/US18/48743, mailed on Nov. 14, 2018, 6 pages.
Mendel Rosenblum, "The Reincarnation of Virtual Machines", Jul./Aug. 2004.
Ousterhout et al., "The Case for RAMClouds: Scalable High-Performance Storage Entirely in DRAM" SIGOPS Operating Systems Review, vol. 43, No. 4, pp. 92-105, Dec. 2009.
PCT2013/058271, "Notification of Transmittal of the International Search Report and the Written Opinion of the International Searching Authority, or Declaration", dated Mar. 18, 2014.
PCT20131058262, "Notification of Transmittal of the International Search Report and the Written Opinion of the International Searching Authority, or Declaration", dated Mar. 25, 2014.
Extended European Search Report, EP App. No. 17847309.6, Apr. 2, 2020, 07 pages.
Hui et al., "Study on Application of Cloud Computing Technology in Nuclear Power Plant Design Platform", Science and Technology on Reactor System Design Technology Laboratory, Jul. 2013, 4 pages.
Wikipedia, "Processor affinity", available online at <https://en.wikipedia.org/w/index.php? title=Processor_affinity&oldid=730409119>, Jul. 18, 2016, 3 pages.

\* cited by examiner

INITIAL (Time 0) MEMORY ASSIGNMENT

| BLOCK | | Current Owner | Last Owner |
|---|---|---|---|
| 0 | — FFFFF | Node 0 | Node 0 |
| 10000 | — 1FFFFF | Node 0 | Node 0 |
| 20000 | — 2FFFFF | Node 0 | Node 0 |
| 30000 | — 3FFFFF | Node 1 | Node 1 |
| 40000 | — 4FFFFF | Node 1 | Node 1 |
| 50000 | — 5FFFFF | Node 1 | Node 1 |
| 60000 | — 6FFFFF | Node 2 | Node 2 |
| 70000 | — 7FFFFF | Node 2 | Node 2 |
| 80000 | — 8FFFFF | Node 2 | Node 2 |

... } 1002

INITIAL (Time 0) PROCESSOR ASSIGNMENT

| O/S Processor | Node | # on Node |
|---|---|---|
| P00 | 0 | 0 |
| P01 | 0 | 1 |
| P02 | 0 | 2 |
| P03 | 0 | 3 |
| P04 | 1 | 0 |
| P05 | 1 | 1 |
| P06 | 1 | 2 |
| P07 | 1 | 3 |
| P08 | 2 | 0 |
| P09 | 2 | 1 |
| P10 | 2 | 2 |
| P11 | 2 | 3 |
| P12 | 3 | 0 |

Time 1 MEMORY ASSIGNMENT
(Updated)

| BLOCK | | Current Owner | Last Owner |
|---|---|---|---|
| 0 | FFFF | Node 0 | Node 0 |
| 10000 | 1FFFF | Node 0 | Node 0 |
| 20000 | 2FFFF | Node 2 | Node 0 |
| 30000 | 3FFFF | Node 1 | Node 1 |
| 40000 | 4FFFF | Node 1 | Node 1 |
| 50000 | 5FFFF | Node 1 | Node 1 |
| 60000 | 6FFFF | Node 2 | Node 2 |
| 70000 | 7FFFF | Node 2 | Node 2 |
| 80000 | 8FFFF | Node 0 | Node 2 |
| ... | | | |

(SWAP between 20000 and 80000 rows)

Time 1 PROCESSOR ASSIGNMENT
(Unchanged)

| O/S Processor | Node | # on Node |
|---|---|---|
| P00 | 0 | 0 |
| P01 | 0 | 1 |
| P02 | 0 | 2 |
| P03 | 0 | 3 |
| P04 | 1 | 0 |
| P05 | 1 | 1 |
| P06 | 1 | 2 |
| P07 | 1 | 3 |
| P08 | 2 | 0 |
| P09 | 2 | 1 |
| P10 | 2 | 2 |
| P11 | 2 | 3 |
| P12 | 3 | 0 |
| ... | | |

FIG. 11

Time 2 PROCESSOR ASSIGNMENT
(Updated)

| O/S Processor | Node | # on Node |
|---|---|---|
| P00 | 0 | 0 |
| P06 | 0 | 1 |
| P02 | 0 | 2 |
| P03 | 0 | 3 |
| P04 | 1 | 0 |
| P05 | 1 | 1 |
| P01 | 1 | 2 |
| P07 | 1 | 3 |
| P08 | 2 | 0 |
| P09 | 2 | 1 |
| P10 | 2 | 2 |
| P11 | 2 | 3 |
| P12 | 3 | 0 |

...

SWAP (between P06 and P01)

Time 2 MEMORY ASSIGNMENT
(Same as Time 1)

| BLOCK | | Current Owner | Last Owner |
|---|---|---|---|
| 0 | - FFFF | Node 0 | Node 0 |
| 10000 | - 1FFFF | Node 0 | Node 0 |
| 20000 | - 2FFFF | Node 2 | Node 0 |
| 30000 | - 3FFFF | Node 1 | Node 1 |
| 40000 | - 4FFFF | Node 1 | Node 1 |
| 50000 | - 5FFFF | Node 1 | Node 1 |
| 60000 | - 6FFFF | Node 2 | Node 2 |
| 70000 | - 7FFFF | Node 2 | Node 2 |
| 80000 | - 8FFFF | Node 0 | Node 2 |

NETWORK ATTACHED MEMORY USING SELECTIVE RESOURCE MIGRATION

CROSS REFERENCE TO OTHER APPLICATIONS

This application is a continuation of U.S. patent application Ser. No. 15/279,187, entitled NETWORK ATTACHED MEMORY USING SELECTIVE RESOURCE MIGRATION filed Sep. 28, 2016 which is incorporated herein by reference for all purposes, which claims priority to U.S. Provisional Application No. 62/236,076, entitled NETWORK ATTACHED MEMORY USING SELECTIVE RESOURCE MIGRATION filed Oct. 1, 2015 which is incorporated herein by reference for all purposes.

BACKGROUND OF THE INVENTION

One typical way in which flash memory is used is to simulate disks in servers. It would be beneficial to use flash memory in additional ways. Unfortunately, existing system software solutions for servers do not provide mechanisms for using flash memory other than as disk storage.

BRIEF DESCRIPTION OF THE DRAWINGS

Various embodiments of the invention are disclosed in the following detailed description and the accompanying drawings.

FIG. 10 illustrates an example of an initial memory assignment and processor assignment.

FIG. 11 illustrates an updated view of the memory assignment and an unchanged view of the processor assignment.

FIG. 12 illustrates a memory assignment and an updated view of the processor assignment.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Figure 1:
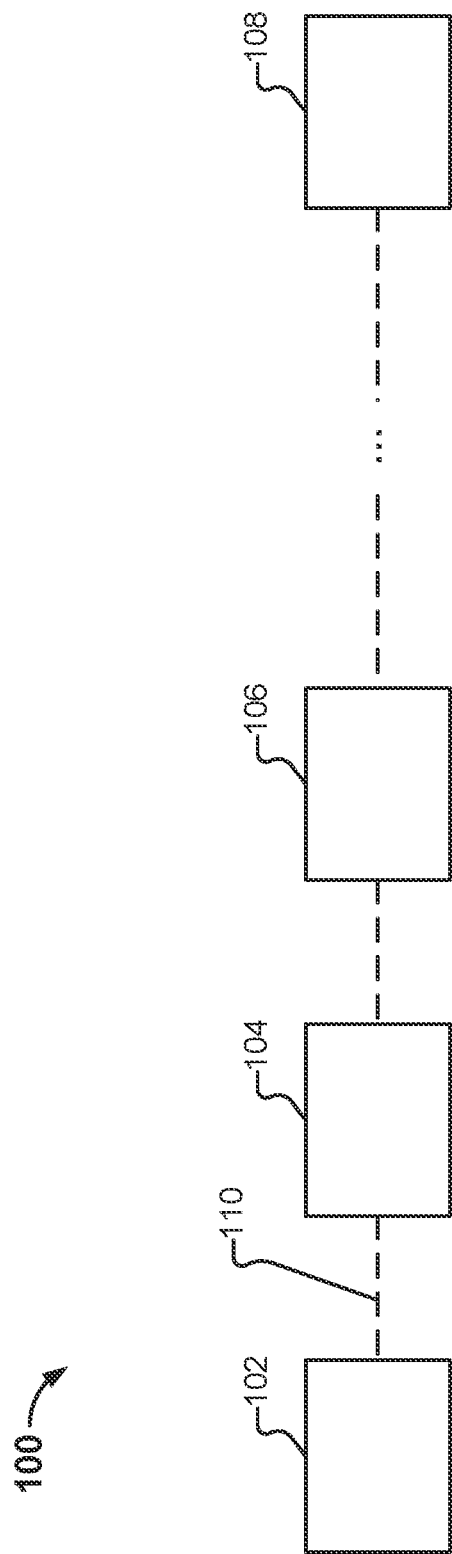
FIG. 1 illustrates an embodiment of a computer system.

FIG. 1 illustrates an embodiment of a computer system. System 100 is also referred to herein as an "enterprise supercomputer" and a "mainframe." In the example shown, system 100 includes a plurality of nodes (e.g., nodes 102-108) located in close proximity (e.g., located within the same rack). In other embodiments, multiple racks of nodes (e.g., located within the same facility) can be used in the system. Further, the techniques described herein can also be used in conjunction with distributed systems.

The nodes are interconnected with a high-speed interconnect (110) such as 10-gigabit Ethernet, direct PCI-to-PCI, and/or InfiniBand. Each node comprises commodity server-class hardware components (e.g., a blade in a rack with its attached or contained peripherals). In the example shown in FIG. 1, each node includes multiple physical processor chips. Each physical processor chip (also referred to as a "socket") includes multiple cores, and each core has multiple hyperthreads.

Figure 2:
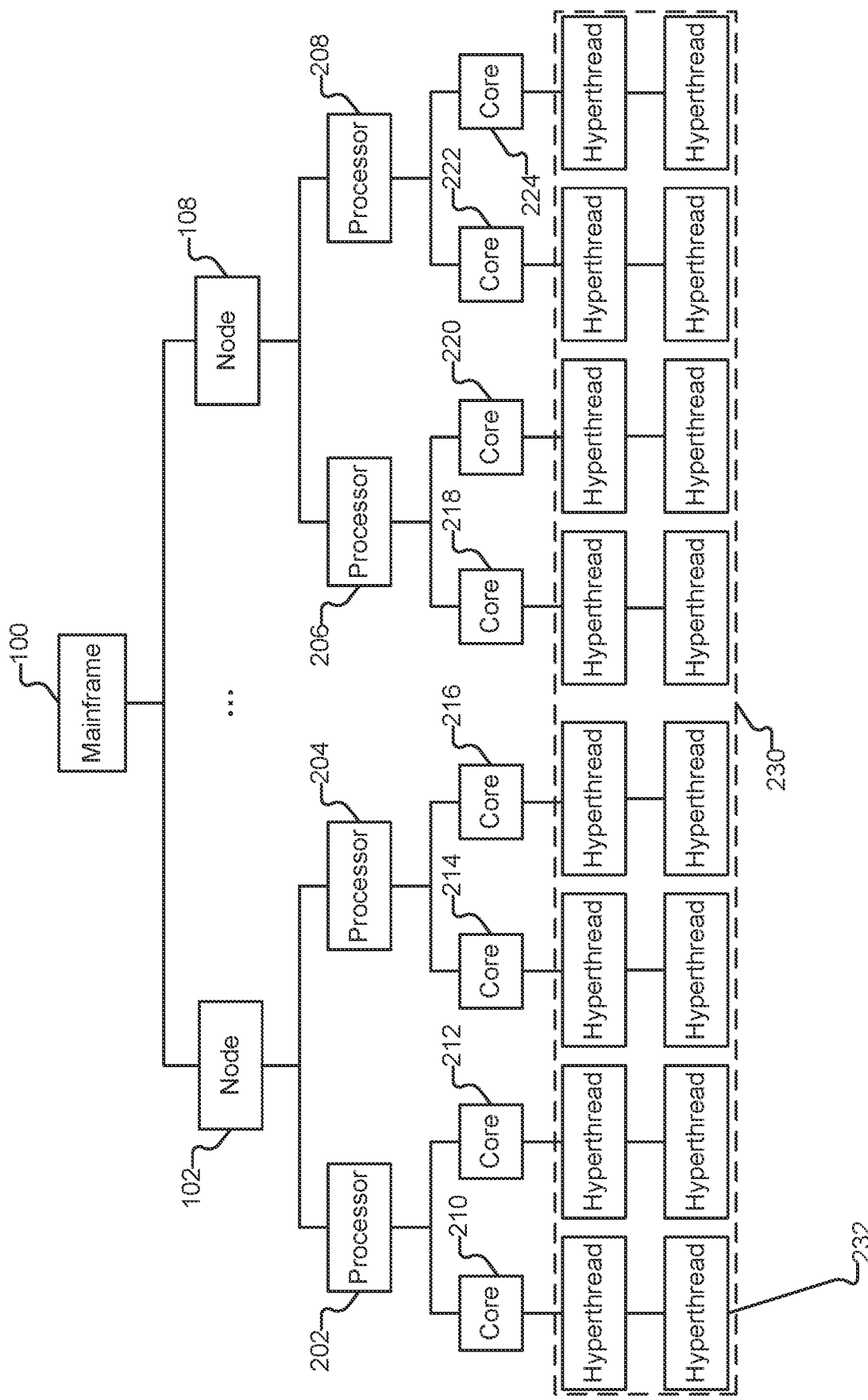
FIG. 2 illustrates the physical structure of the computer system as a hierarchy.

As illustrated in FIG. 2, the physical structure of system 100 forms a hierarchy (from the bottom) of hyperthreads (230), cores (210-224), physical processor chips (202-208), and nodes (102-108 (with nodes 104, 106, etc. omitted from the figure and represented as ellipses)). The tree depicted in FIG. 2 is of a fixed size, defined by the hardware configuration.

As will be described in more detail below, each enterprise supercomputer (e.g., system 100) runs a single instance of an operating system. Both the operating system, and any applications, can be standard commercially available software and can run on system 100. In the examples described herein, the operating system is Linux, however other operating systems can also be used, such as Microsoft Windows, Mac OS X, or FreeBSD.

Figure 3A:
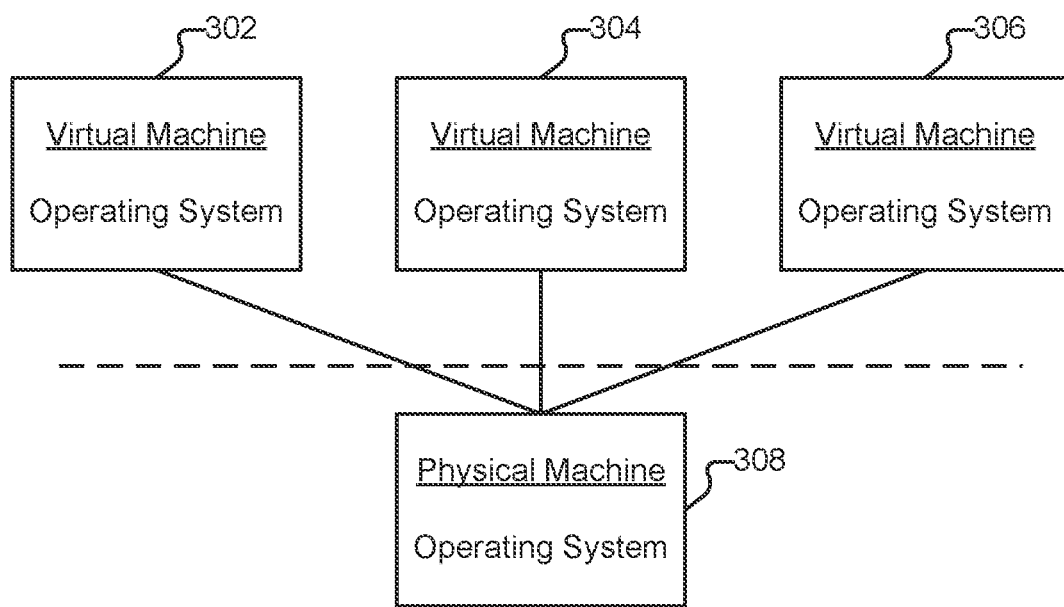
FIG. 3A depicts a virtualized computing environment in which multiple virtual machines (with respective multiple guest operating systems) run on a single physical machine.
Figure 3B:
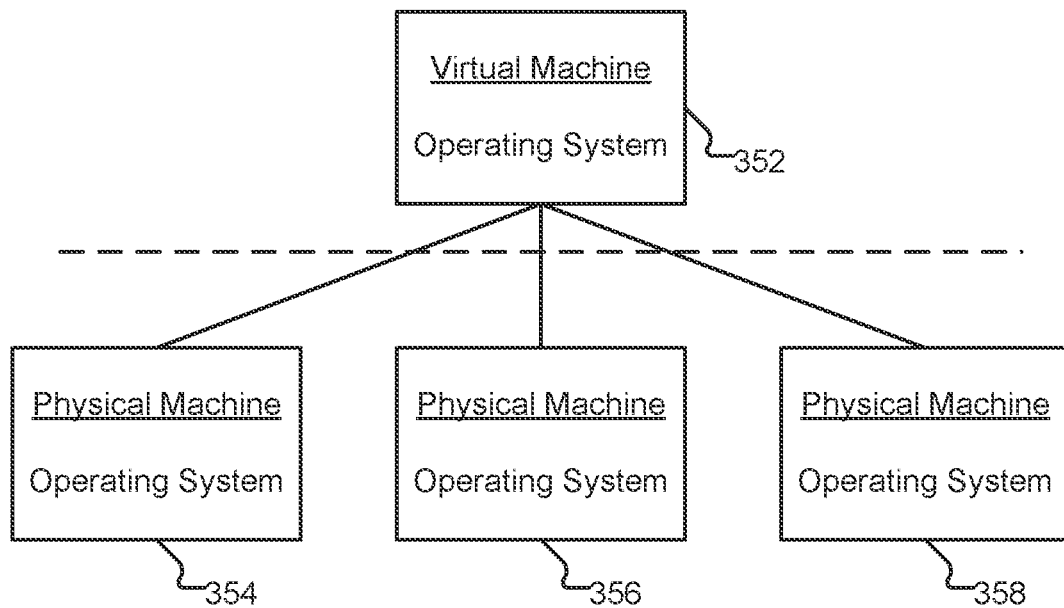
FIG. 3B depicts a virtualized computing environment in which multiple physical machines collectively run a single virtual operating system.

In a traditional virtualized computing environment, multiple virtual machines may run on a single physical machine. This scenario is depicted in FIG. 3A. In particular, three virtual machines (302-306) are running three guest operating systems on a single physical machine (308), which has its own host operating system. In contrast, using the techniques described herein, multiple physical machines (354-358) collectively run a single virtual operating system (352), as depicted in FIG. 3B.

Figure 4A:
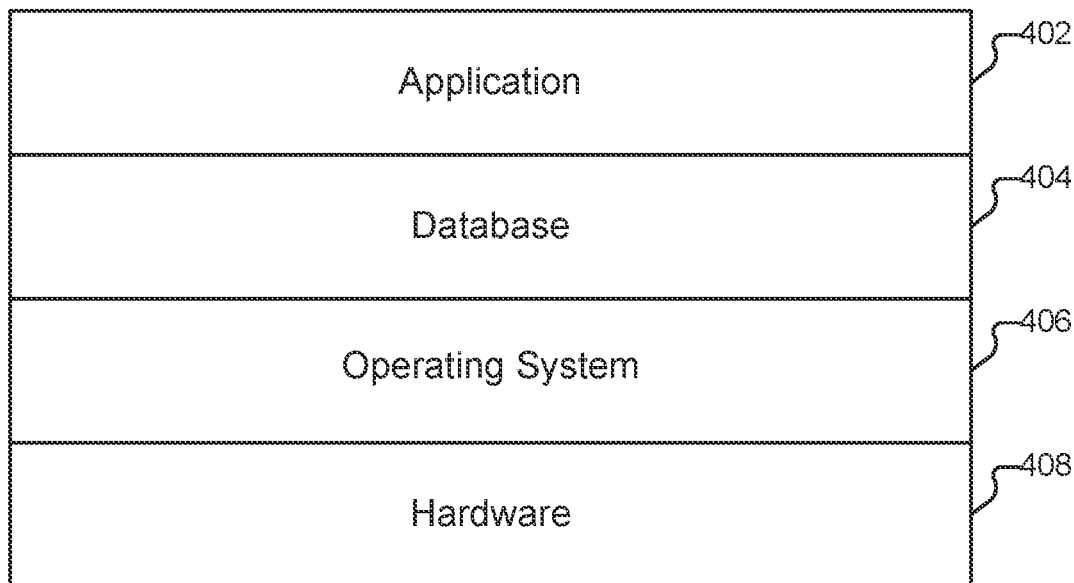
FIG. 4A depicts an example of a software stack.
Figure 4B:
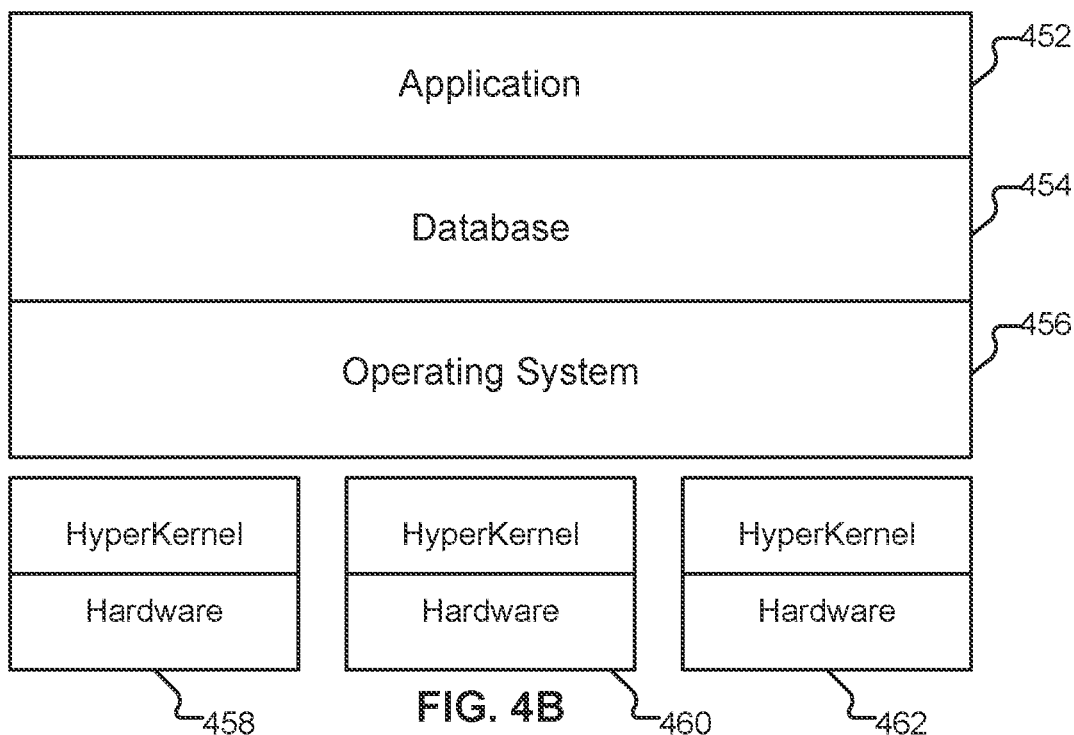
FIG. 4B depicts an example of a software stack.

One example of a software stack is depicted in FIG. 4A. Such a stack may typically be used in traditional computing environments. In the stack shown in FIG. 4A, an application (402) sits above a database engine (404), which in turn sits upon an operating system (406), underneath which lies hardware (408). FIG. 4B depicts a software stack used in some embodiments. As with the stack shown in FIG. 4A, an application (452) sits above a database engine (454), which in turn sits upon an operating system (456). However, underneath the operating system and above the hardware is a layer of software (referred to herein as a hyper-kernel) that observes the system running in real time and optimizes the system resources to match the needs of the system as it operates. The hyper-kernel conceptually unifies the RAM, processors, and I/O (Input Output resources for example Storage, Networking resources) of a set of commodity servers, and presents that unified set to the operating system. Because of this abstraction, the operating system will have the view of a single large computer, containing an aggregated set of processors, memory, and I/O. As will be described in more detail below, the hyper-kernel optimizes use of resources. The hyper-kernel can also help optimize other I/O system resources such as networks and storage. In some embodiments, based on observations and profiles of running software, performance indicators (hints) are provided to upper layers (e.g., database management systems) about the dynamic performance of the system that can further improve overall system performance.

The hyper-kernel can be ported to all major microprocessors, memory, interconnect, persistent storage, and networking architectures. Further, as hardware technology evolves (e.g., with new processors, new memory technology, new interconnects, and so forth), the hyper-kernel can be modified as needed to take advantage of industry evolution.

As shown in FIG. 4B, operating system 456 is running collectively across a series of nodes (458-462), each of which has a hyper-kernel running on server hardware. Specifically, the operating system is running on a virtual environment that is defined by the collection of hyper-kernels. As will be described in more detail below, the view for operating system 456 is that it is running on a single hardware platform that includes all of the hardware resources of the individual nodes 458-462. Thus, if each of the nodes includes 1 TB of RAM, the operating system will have as a view that it is running on a hardware platform that includes 3 TB of RAM. Other resources, such as processing power, and I/O resources can similarly be collectively made available to the operating system's view.

Figure 5:
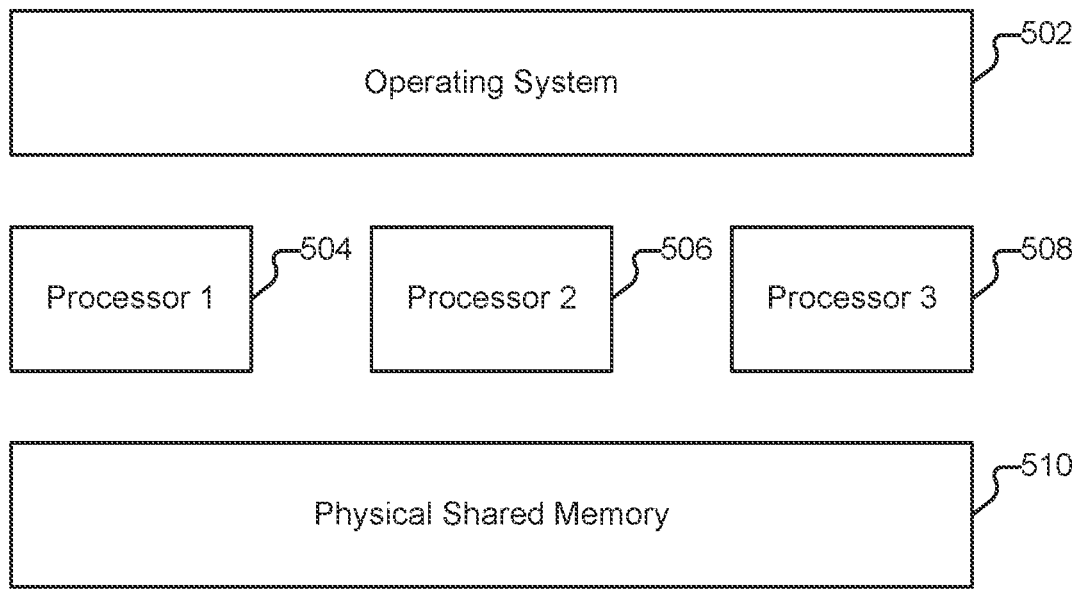
FIG. 5 depicts an example of an operating system's view of hardware on an example system.

FIG. 5 depicts an example of an operating system's view of hardware on an example system. Specifically, operating system (502) runs on top of processors 504-508 and physical shared memory 510. As explained above, an operating system can run on either a traditional computing system or on an enterprise supercomputer such as is shown in FIG. 1. In either case, the view of the operating system will be that it has access to processors 504-508 and physical shared memory 510.

Figure 6A:
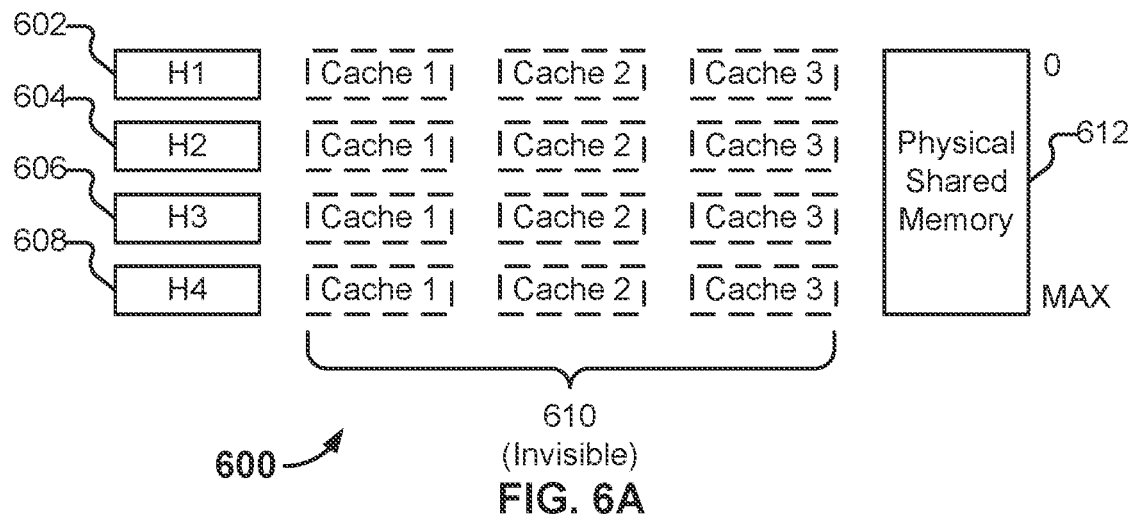
FIG. 6A depicts an example of a hyperthread's view of hardware on a single node.

FIG. 6A depicts an example of a hyperthread's view of hardware on a single node. In this example, a node has four hyperthreads denoted H1 (602) through H4 (608). Each hyperthread can access all portions of physical shared memory 612. Physical shared memory 612 is linear, labeled location 0 through a maximum amount, "max." The node also includes three levels of cache (610).

Figure 6B:
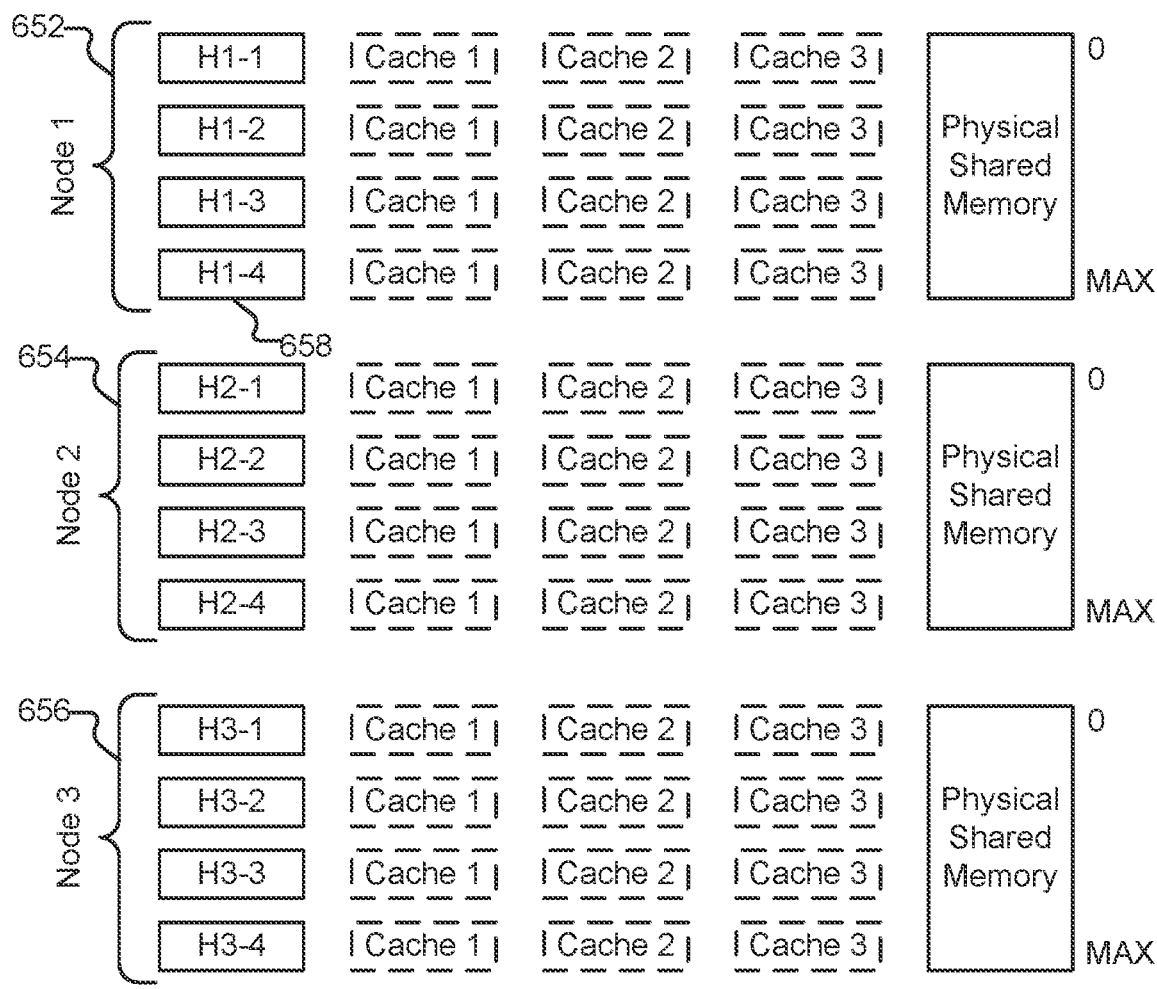
FIG. 6B depicts an example of a hyper-kernel's view of hardware on an example system.

FIG. 6B depicts an example of a hyper-kernel's view of hardware on an example system. In this example, three nodes (652-656) are included in an enterprise supercomputer. Each of the three nodes has four hyperthreads, a physical shared memory, and cache (i.e., each node is an embodiment of node 600 shown in FIG. 6A). A hyperthread on a given node (e.g., node 652) has a view that is the same as that shown in FIG. 6A. However, the hyper-kernel is aware of all of the resources on all of the nodes (i.e., the hyper-kernel sees twelve hyperthreads, and all of the physical shared memory). In the example shown in FIG. 6B, a given hyperthread (e.g., hyperthread 658, "H1-4") is labeled with its node number (e.g., "1") followed by a hyperthread number (e.g., "4").

Figure 7:
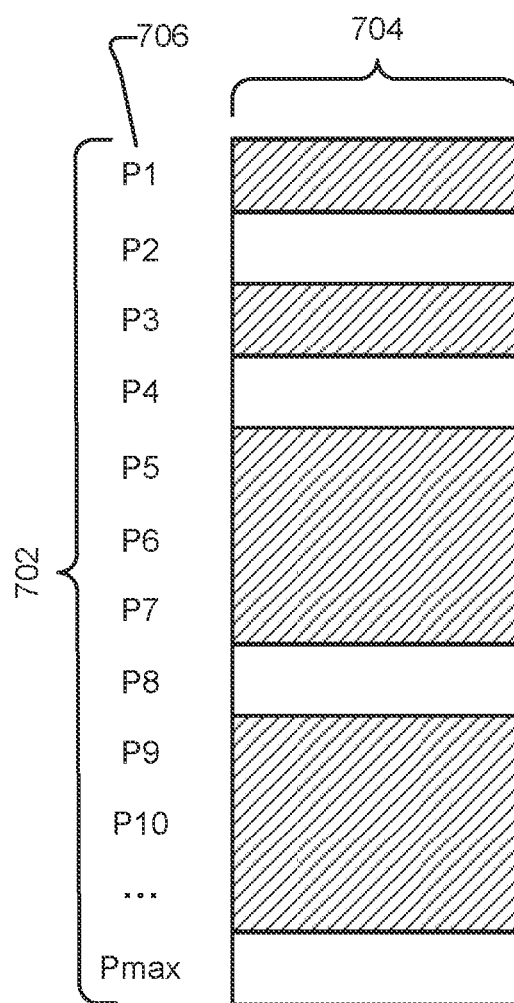
FIG. 7 depicts an example of an operating system's view of hardware on an example of an enterprise supercomputer system.

FIG. 7 depicts an example of an operating system's view of hardware on an example of an enterprise supercomputer system. The operating system sees a plurality of "virtualized processors" denoted in FIG. 7 as P1 through Pmax (702). The virtualized processors correspond to the total number of hyperthreads across all nodes included in the enterprise supercomputer. Thus, using the example of FIG. 6B, if a total of twelve hyperthreads are present across three nodes, a total of twelve virtualized processors would be visible to an operating system running on the enterprise supercomputer. The operating system also sees "virtualized physical memory" (704) that appears to be a large, physical, linear memory of a size equal to the total amount of physical memory across all nodes.

As will be described in more detail below, the hyper-kernel dynamically optimizes the use of cache memory and virtual processor placement based on its observations of the system as it is running. A "virtual processor" is a computing engine known to its guest operating system, i.e., one that has some operating system context or state. As will be described in more detail below, a "shadow processor" is an anonymous virtual processor, i.e., one that had been a virtual processor but has now given up its operating system context and has context known only to the hyper-kernel.

Resource Virtualization

Memory Virtualization

As explained above, in the physical configuration, each node has an array of memory addresses representing locations in memory. As such, in a physical configuration with three nodes (e.g., as depicted in FIG. 6B), there are three memory locations each of which has address 0x123456. In contrast, in the virtual configuration, all memory addresses are unique and represent the sum total of all memory contained in those three nodes. In the virtual configuration, all memory is shared, and all memory caches are coherent.

In some embodiments, memory is further subdivided into a series of contiguous blocks, with monotonically increasing memory addresses. In the examples described herein, each page has 4K bytes of memory, however, other subdivisions can also be used, as applicable. The term "blocks" is used herein to describe contiguous arrays of memory locations. In some embodiments, the "blocks" are "pages."

Processor Virtualization

A virtual processor (e.g., virtual processor 706 of FIG. 7), as seen by the operating system, is implemented on a hyperthread in the physical configuration, but can be location independent. Thus, while the operating system thinks it has 500 processors running on a single physical server, in actuality it might have 5 nodes of 100 processors each. (Or, as is shown in FIG. 6B, the operating system will think it has twelve processors running on a single physical server.) The computation running on a virtual processor is described either by the physical configuration on a hyperthread when the computation is running, or in a "continuation," when the virtual processor is not running (i.e., the state of an interrupted or stalled computation).

As used herein, a "continuation" represents the state of a virtual processor. Each continuation:

Has processor state (i.e., saved registers, etc.).
Has a set of performance indicators that guide a scheduler object with information about how to intelligently assign continuations to leaf nodes for execution.
Has a virtual-processor identifier that indicates the processor the operating system thinks is the physical processor to which this continuation is assigned.
Has an event on which this continuation is waiting (possibly empty).
Has a state which includes: "waiting-for-event" or "ready."

I/O Virtualization

I/O systems observe a similar paradigm to processors and memory. Devices have a physical address in the physical configuration and virtual addresses in the virtual configuration. When migrating computations (described in more detail below), if for example, there are memory buffers associated with I/O operations, the I/O devices used will likely perform better if they are co-located with the memory with which they are associated, and can be moved accordingly.

Resource Maps

Resource maps are used to translate between virtual and physical configurations. The following are three types of resource maps used by enterprise supercomputers in various embodiments.

A "physical resource map" is a table that describes the physical resources that are available on each node. It contains, for example, the number and type of the processors on each node, the devices, the memory available and its range of physical addresses, etc. In some embodiments, this table is read-only and is fixed at boot time.

An "initial virtual resource map" is fixed prior to the booting of the operating system and describes the virtual resources that are available from the point of view of the operating system. The configuration is readable by the operating system. In some cases, it may be desirable to configure a system (from the viewpoint of the operating system) that does not match, one-to-one, with the underlying hardware resources. As one example, it may be desirable for the operating system to have more memory and fewer cores. This can be accomplished by changing the ratio of memory to cores, i.e., by modifying the initial virtual resource map.

A "current resource map" is created and maintained by each hyper-kernel instance. This map describes the current mapping between the virtual resource map and the physical resource map from the point of view of each node. For each entry in the virtual resource map, a definition of the physical resources currently assigned to the virtual resources is maintained. Initially (e.g., at boot time), the current resource map is a copy of the initial virtual resource map. The hyper-kernel modifies the current resource map over time as it observes the characteristics of the resource load and dynamically changes the mapping of physical resources to virtual resources (and vice-versa). For example, the definition of the location of the Ethernet controller eth27 in the virtualized machine may at different times refer to different hardware controllers. The current resource map is used by the hyper-kernel to dynamically modify the virtual hardware resource mappings, such as the virtual memory subsystem, as required.

Resource Migration Overview

Using the techniques described herein, virtualized resources can be migrated between physical locations. As explained above, the operating system is provided with information about the virtualized system, but that information need not agree with the physical system.

In the following example, suppose an enterprise supercomputer holds a large in-memory database, larger than can fit into a single node. Part of the database is in a first node, "node1." Suppose one of the cores on a different node, "node2," is trying to access data that is owned by node1 and that does not reside locally in a cache on node2. The core on node2 will receive a memory access violation because it is trying to access data that it believes it should be able to access (but cannot). As will be described in more detail below, the exception is handled in the hyper-kernel.

One way that the situation can be resolved is by moving the needed area of memory to node2, and then returning control back to the operating system (which, in turn, returns it back to the database system). The software can then proceed as intended (i.e., as if the access violation never occurred).

In many cases, there may be one or more other cores in other nodes (e.g., "node3") that are also trying to access the same area block of memory as needed by node2 above. Node3 might be attempting to access the same data, or it might be accessing different data contained in the memory that was moved (also referred to as "false sharing"). The data could be moved to node3, but if the core on node2 asks for the data a second time, the data would need to be moved back to node2 (i.e., potentially moving the data back and forth repeatedly), which can be slow and wasteful. One way to avoid moving data back and forth between cores is to recognize that both cores and the associated block of data should be co-located. Using the techniques described herein, the memory and the computation can be migrated so that they reside on the same node. Doing so will result in a higher likelihood of faster access to data, and a higher probability of sharing data stored in local caches.

When the access violation occurs, an event is triggered (in a system dependent way) to which the hyper-kernel responds. One example of how such an event can be handled is by the invocation of a panic routine. Other approaches can also be used, as applicable. As will be described in more detail below, the hyper-kernel examines the cause of the event and determines an appropriate strategy (e.g., low level transaction) for handling the event. As explained above, one way to handle the event is for one or more blocks of hyper-kernel virtualized memory to be transferred from one node's memory to another node's memory. The transfer would then be initiated and the corresponding resource maps would be updated. A continuation would be built poised to be placed in a local table in shared memory called the event table (discussed below) so that the next thing the continuation does when it is resumed would be to return control to the operating system after the transfer is completed. A decision could also be made to move the virtual processor to the node that contains the memory being requested or to move the virtualized memory (and its virtualized memory address) from one node to another. In various embodiments, the hyper-kernel makes three decisions when handling an event: which (virtual) resources should move, when to move them, and to where (in terms of physical locations) they should move.

TidalTree

The physical hierarchical structure depicted in FIG. 2 has an analogous software hierarchy comprising a set of "scheduler objects" (i.e., data structures), each of which has a set of characteristics described below. The scheduler objects form a "TidalTree," which is an in-memory tree data structure in which each node of the tree is a scheduler object. Each scheduler object corresponds to an element of the physical structure of the supercomputer (but not necessarily vice versa), so there is one node for the entire machine (e.g., node 100 as shown in FIG. 2), one node for each physical node of the system (e.g., node 102 as shown in FIG. 2), one node for each multicore socket on the physical nodes that comprise the entire machine (e.g., node 202 as shown in FIG. 2), one node for each core of each socket (e.g., node 210 as shown in FIG. 2), and one node for each hyperthread on that core (e.g., node 232 as shown in FIG. 2).

Each scheduler object s:
  Is associated with a physical component (e.g., rack, blade, socket, core, hyperthread).
  Except for the root of the tree, has a parent scheduler object which is partly responsible for directing its operations (as explained in more detail below).
  Has a set of children each of which is a scheduler object. This is the null set for a leaf (e.g., hyperthread) node. As explained in more detail below, it is the responsibility of a scheduler object s to manage and assign (or re-assign) work to its children, and indirectly to its grandchildren, etc. (i.e., s manages all nodes in the subtree rooted at s).
  Has a work queue, which is a set of continuations (as described earlier).
  Has a (possibly empty) set of I/O devices that it also has the responsibility to manage and assign (or re-assign) work.

Each node can potentially be associated with a layer of some form of cache memory. Cache hierarchy follows the hierarchy of the tree in the sense that the higher the scheduler object is, the slower it will usually be for computations to efficiently utilize caches at the corresponding level of hierarchy. The cache of a scheduler object corresponding to a physical node can be a cache of memory corresponding to that node. The memory on the physical node can be thought of as a cache of the memory of the virtual machine.

Resource Migration—Additional Information

The hyper-kernel simulates part of the virtual hardware on which the virtual configuration resides. It is an event-driven architecture, fielding not only translated physical hardware events, but soft events, such as receipt of inter-node hyper-kernel messages generated by hyper-kernel code running on other nodes.

As explained above, when an interrupt event significant to the hyper-kernel occurs, the hyper-kernel makes a decision of how to respond to the interrupt. Before control is returned to the operating system, any higher priority interrupts are recognized and appropriate actions are taken. Also as explained above, the hyper-kernel can make three separate decisions: (1) which resources to migrate upon certain events, (2) when to migrate them, and (3) to where those resources should move.

In the following example, suppose a scheduler object "s" in a virtual machine is in steady state. Each scheduler object corresponding to a physical node has a set of physical processor sockets assigned to it. Hyperthreads in these sockets may or may not be busy. The physical node also has some fixed amount of main memory and a set of I/O devices, including some network devices. Scheduler object s, when corresponding to a node, is also responsible for managing the networks and other I/O devices assigned to nodes in the subtree rooted at s. The following is a description of how resources can migrate upon either synchronous or asynchronous events.

Migrations Triggered by Synchronous Events

In the following example, suppose there exists a leaf node scheduler object s, and virtual processor p assigned to s. Leaf node schedule object s is assumed to be executing an application or operating system code on behalf of an application. Assuming the leaf node is not in an infinite loop, p will eventually run out of work to do (i.e., stall) for some reason (e.g., waiting for completion of an I/O operation, page fault, etc.). Instead of allowing p to actually stall, the hyper-kernel decides whether to move the information about the stalled computation to some other node, making one of that other node's processors "responsible" for the stalled continuation, or to keep the "responsibility" of the stalled computation on the node and instead move the relevant resources to the current node.

The stall is thus handled in either of two ways: either the computation is moved to the physical node that currently has the resource, or else the resource is moved to the physical node that has requested the resource. Example pseudo code for the handling of a stall is provided below (as the "OnStall" routine) in the "EXAMPLE ROUTINES" section below.

Decisions such as how to handle a stall can be dependent on many things, such as the order of arrival of events, the state of the computation running on the virtual machine, the state of the caches, the load on the system or node, and many other things. Decisions are made dynamically, i.e., based on the best information available at any given point in time.

Recording Stalled Computations

Stalled computations are recorded in a data structure referred to as a "continuation." A continuation has a status that can be, for example, "waiting-for-event" or "ready." A stalled computation gets recorded as a newly created continuation with status "waiting-for-event." Once the reason for stalling is satisfied (e.g., due to detection of the event), the status of the corresponding continuation is changed to "ready." Each continuation with status "ready" is stored in a "wait queue" of a scheduler object so that eventually it gets scheduled for execution. In contrast, any continuation with status "waiting-for-event" will not be stored in any scheduler object's wait queue. Instead, it is stored in the local shared memory of the physical node where the hardware event that stalled the corresponding computation is expected to occur, such as receipt of a missing resource.

Additionally, the newly created continuation is associated with the stalling event that caused its creation. This mapping between (stalling) events and continuations awaiting these events permits fast dispatch of asynchronous events (see the "handleEvent" described below). The mapping between continuations and events is stored in a table called "event table" and is kept in the shared memory of the corresponding physical node. Each physical node has its own event table, and an event table of a physical node is directly addressable by every core on that physical node. All anticipated events recorded in an event table of a physical node correspond to hardware events that can occur on that physical node. The scheduler object s mapped to a physical node n represents n, and the event table of n is associated with s. In some cases, several continuations may be waiting on the same event, and so some disambiguation may be required when the event is triggered.

Continuations are built using the "InitContinuation" routine. If a decision is made to move the computation, the remote physical node holding the resource will build a continuation that corresponds to the stalled computation and will store it in the remote physical node's event table. When that continuation resumes, the resource will be available. In effect, the hyper-kernel has transferred the virtual processor to a different node.

In the case where a decision is made to move the resource, the node that has experienced the stall requests the transfer of the resource and builds a continuation using InitContinuation and stores it in the local event table. Upon receipt of the resource, the continuation is attached to an appropriate node in the TidalTree, and when that continuation is resumed, the resource will be generally be available and visible. In effect, the virtual resource has been transferred to the node that requested it.

Note that by placing continuations in event tables, it is guaranteed that the processor that receives the event will quickly find the related continuations in its local event table. The reason for the stall in the computation will have been satisfied.

Having dealt with the stall, the virtual-processor p will in effect be suspended. In between processing the stall and finding a new continuation to resume, p becomes an "anonymous shadow processor," i.e., a processor with no identity known to the operating system. This shadow processor then looks for a new continuation to resume. An example of this is shown below in the "assignProcessor" routine described in more detail below.

Notation

Let e be the event that stalled virtual processor p. Assume that e is triggered by local hardware of some physical node n. In particular, assume r is the resource, which caused the stalling event to occur. Resource r could be a block of memory, or an I/O operation, or a network operation. Assume that p is assigned to scheduler object s, which belongs to the subtree rooted at the scheduler object that represents physical node n.

On-Stall

Pseudo code for an example on-stall routine is provided below in the "EXAMPLE ROUTINES" section. The migration-continuation function returns true if and only if processor p in node n decides that the resource should not move, i.e., the computation should move. This can be determined by a number of factors such as history and frequency of movement of r between nodes, the type of r, the cost of movement, the number of events in n's local event table waiting for r, system load, etc. For example, it may not be desirable to move a resource if there is a continuation stored in n's local event table that is waiting for it.

A variety of patterns of events that would benefit from migrations exist. One approach to describing these patterns of events, like access violations, is in formal language theory. Regular (i.e., Chomsky type-3) languages can be recognized by finite state automata. In addition, using a compact and flexible notation, a description of the events that are observed can be made as sentences (or Chomsky sequences) in the regular language, and the recognition modeled as state transitions in the corresponding finite state automaton. When the full Chomsky sequence of events is seen, migration-continuation gets evaluated accordingly: if the finite state automaton accepts the Chomsky sequence, the condition is met, otherwise, it is not met. The length of the minimized finite state machine defines the amount of history that needs to be kept.

In various embodiments, all events happen locally, and the hyper-kernel on the physical node receiving the event must handle it—truly synchronous events are not assumed to occur between physical nodes. To coordinate migration strategy between nodes, "messages" are used. Message "sends" are synchronous from a node's point of view, but message "receives" are asynchronous, in that a processor or shadow processor, in general, does not wait for receipt of a message. When messages arrive, they are dealt with by the hyper-kernel as a virtual interrupt. In one embodiment, the hyper-kernel will not allow a processor to resume a continuation while there are messages waiting to be handled. Therefore, before control is transferred back to the operating system, the queue is checked, and any messages are dealt with prior to the transfer of control back to the operating system.

For scheduler object s and continuation c, a cost function cost(s,c) can be used to guide the search up the tree. If multiple ancestors of p have non-empty queues, then p may not want to stop its search at the first ancestor found with a nonempty wait queue. Depending on the metrics used in the optimizing strategy, p's choice may not only depend on the distance between p and its chosen ancestor but on other parameters such as length of the wait queues.

A function, find-best-within(s), can be used to return the "best-fit" continuation in a (non-empty) wait queue of a scheduler object. Examples of parameters that can be considered include:

1. Position in the queue
2. The relationship between p and the last location recorded in the continuation (the closer those locations are the better it may be for reusing cache entries).
3. Performance indicators recorded in the continuations in the queue.

The cost and find-best-within functions can be customized as applicable within a given system.

Migrations Triggered by Asynchronous Events

Examples of asynchronous events include: receipt of a packet, completion of an I/O transfer, receipt of a resource, receipt of a message requesting a resource, etc. Generally, a hyper-kernel that receives an event corresponding to a hardware device managed by the operating system needs to deliver a continuation associated with that event to a scheduler object s. By doing so, s will make this continuation available to an appropriate scheduler object and then ultimately to the computation managed by the operating system represented by that continuation. If, on the other hand, the event is the receipt of a message from a hyper-kernel on another physical node, the hyper-kernel can handle it directly.

To simplify explanation, in the examples described herein, an assumption is made that there is only one continuation associated with an event. The procedures described herein can be generalized for the case where multiple continuations are associated with the same event, as needed.

In some embodiments, the search for a scheduler object on which to place the continuation starts at the leaf of the tree that built the continuation and then proceeds upward (if the computation previously executed on this node). By doing so, the likelihood of reusing cache entries is increased.

Handle-Event

Pseudo code for an example handle-event routine is provided below in the "EXAMPLE ROUTINES" section. The cost function, cost(s,c), is a function that helps determine the suitability of assigning c to scheduling object s. The cost function can depend on a variety of parameters such as the size of the wait queues, the node traversal distance between s and the original scheduling node for c (to increase the probability that cache entries will be reused), and the history of the virtual processor, the physical-processor, and the continuation. If the wait queues of the scheduler objects close to s already contain too many continuations, then it may take a relatively longer time until any newly added continuation is scheduled for execution. Example conditions contributing to cost(s,c) are described below, and the conditions can be customized as applicable.

Costs

Cost functions are used to evaluate options when selecting continuations and scheduling objects. Cost functions can be expressed as the summation of a sum of weighted factors:

$$cost = w_1 f_1^{x_1} + w_2 f_2^{x_2} + \ldots + w_n f_n^{x_n},$$

where $w_i$ indicates the importance of the corresponding factor and $x_i$ indicates an exponential.

Examples of factors $f_i$ are listed for each of the costs below. Weights $w_i$ and exponents $x_i$ can be determined in a variety of ways, such as empirically and by simulation. Initial weights and exponents can be tuned to various application needs, and can be adjusted by an administrator to increase performance. The weights can be adjusted while the system is active, and changing weights does not change the semantics of the hyper-kernel, only the operational performance characteristics.

Examples of the factors that can be considered include:

Length of time since the last processor evacuated this scheduler object.

Height of the scheduler object in the TidalTree.

Length of the work queue.

Reservation status (i.e., it may be the case that some application has reserved this resource for a specific reason).

Node specification (i.e., the node itself might have been taken out of service, or is problematic, has in some way a specialized function, etc.).

Age of the continuation in the queue.

Last physical processor to run this continuation.

Last virtual processor to run this continuation.

Node on which this continuation was last executing.

The "temperature" of the cache. (A cache is "warm" when it has entries that are likely to be reused. A cache is "cold" when it is unlikely to have reusable cache entries.)

Group membership of the continuation (i.e., the continuation may be part of a computation group, each element of which has some affinity for other members of the group).

Performance Indicators (Hints) and special requirements.

EXAMPLES

"OnStall" and "assignProcessor"

Figure 8:
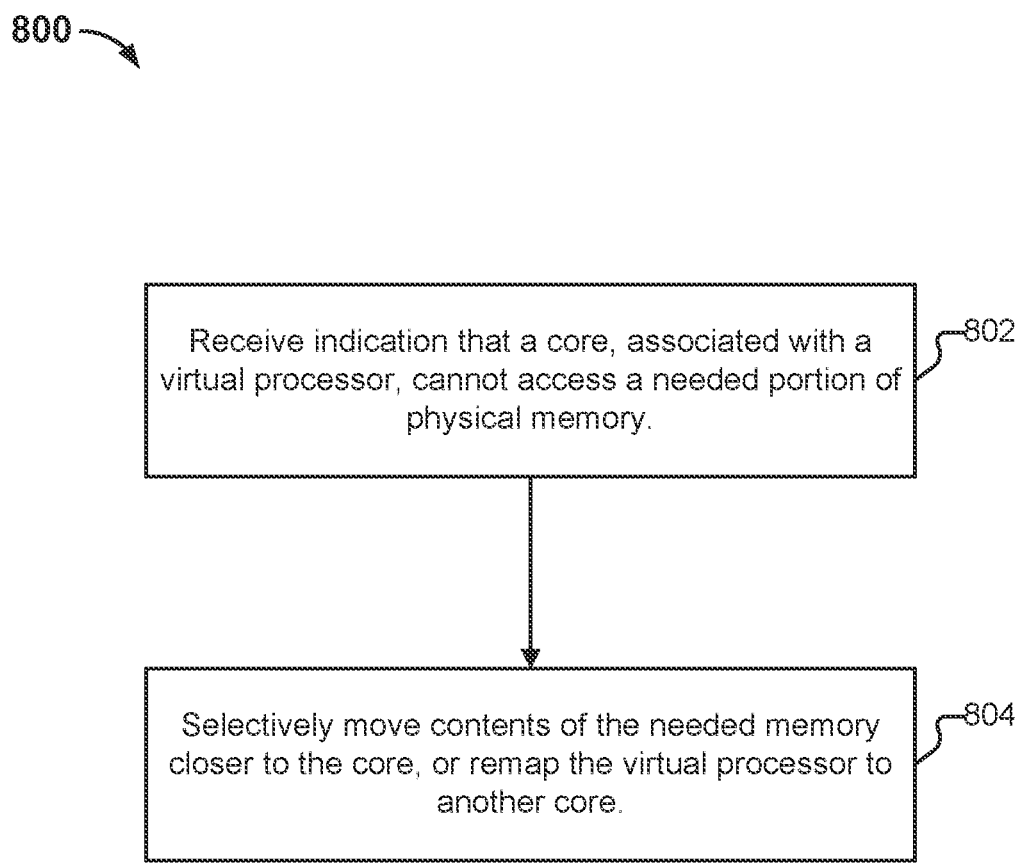
FIG. 8 illustrates an embodiment of a process for selectively migrating resources.

FIG. 8 illustrates an embodiment of a process for selectively migrating resources. In some embodiments, process 800 is performed by a hyper-kernel, such as in conjunction with the OnStall routine. The process begins at 802 when an indication is received that a core (or hyperthread included in a core, depending on whether the processor chip supports hyperthreads) is blocked. As one example, suppose a hyperthread receives a request, directly or indirectly, for a resource that the hyperthread is not able to access (e.g., RAM that is located on a different node than the node which holds the hyperthread). When the hyperthread fails to access the resource (i.e., an access violation occurs), an interrupt occurs, which is intercepted, caught, or otherwise received by the hyper-kernel at 802. In particular, the hyper-kernel receives an indication at 802 that the hyperthread is blocked (because it cannot access a resource that it has been instructed to provide). In addition to reporting its blocked state, the hyperthread provides information such as the memory address it was instructed to access and what type of access was attempted (e.g., read, write, or modify).

At 804, the hyper-kernel determines whether the needed memory should be moved (e.g., to the node on which the blocked hyperthread is located), or whether the requesting process should be remapped (i.e., the virtual processor should be transferred to a different node). The decision can be based on a variety of factors, such as where the needed memory is located, the temperature of the cache, the workload on the node holding the hyperthread, and the workload on the node holding the needed memory (e.g., overworked or underworked). In some embodiments, the workload of a node is determined based at least in part on the average queue length in the TidalTree.

If the hyper-kernel determines that the memory should be moved, the hyper-kernel uses its current resource map to determine which node is likely to hold the needed memory and sends a message to that node, requesting the resource. The hyper-kernel also creates a continuation and places it in its event table. The hyperthread that was blocked at 802 is thus freed to take on other work, and can be assigned to another virtual processor using the assignProcessor routine.

The hyper-kernel checks its message queue on a high-priority basis. When the hyper-kernel receives a message from the node it contacted (i.e., the "first contacted node"), in some embodiments, one of two responses will be received. The response might indicate that the first contacted node has the needed resource (and provide the resource). Alternatively, the message might indicate that the contacted node no longer has the resource (e.g., because the node provided the resource to a different node). In the latter situation, the first contacted node will provide the identity of the node to which it sent the resource (i.e., the "second node"), and the hyper-kernel can send a second message requesting the resource—this time to the second node. In various embodiments, if the second node reports to the hyper-kernel that it too no longer has the resource (e.g., has provided it to a third node), the hyper-kernel may opt to send the continuation to the third node, rather than continuing to request the resource. Other thresholds can be used in determining whether to send the continuation or continuing the resource (e.g., four attempts). Further, a variety of criteria can be used in determining whether to request the resource or send the continuation (e.g., in accordance with a cost function).

In the event the hyper-kernel determines that the continuation should be transferred (i.e., that the computation should be sent to another node rather than receiving the resource locally), the hyper-kernel provides the remote node (i.e., the one with the needed resource) with information that the remote node can use to build a continuation in its own physical address space. If the remote node (i.e., the one receiving the continuation) has all of the resources it needs (i.e., is in possession of the resource that caused the initial access violation), the continuation need not be placed into the remote node's event table, but can instead be placed in its TidalTree. If the remote node needs additional resources to handle the continuation, the received continuation is placed in the remote node's event table.

Figure 9:
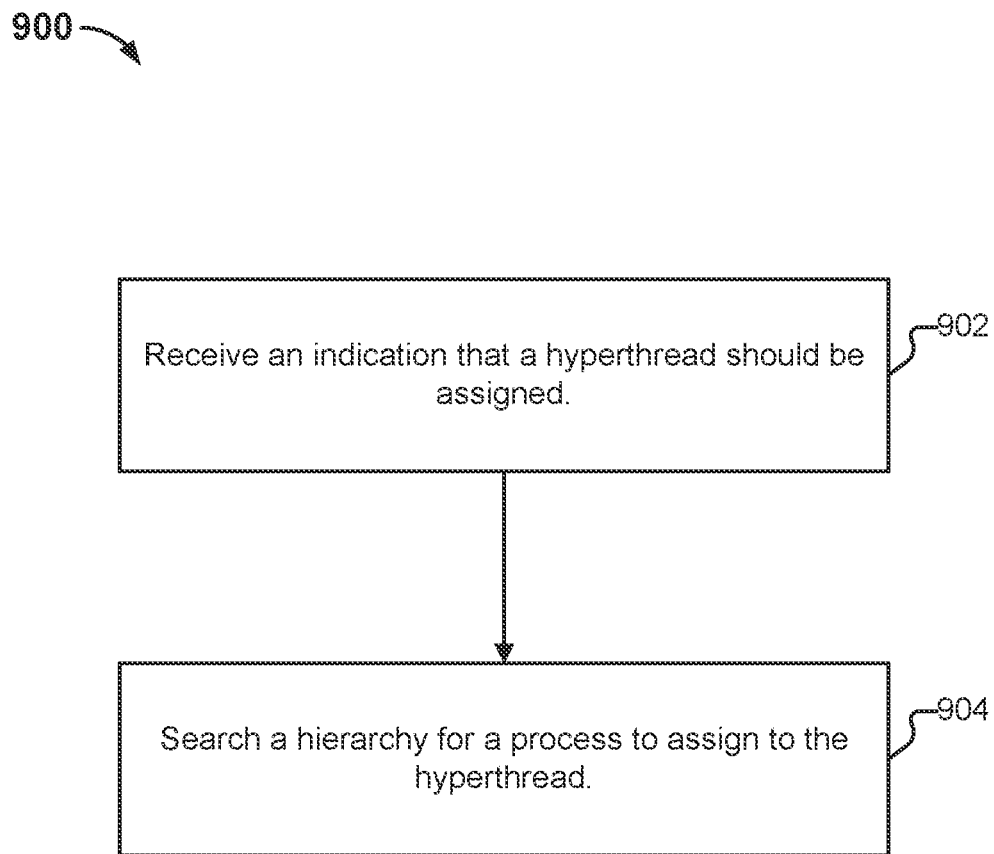
FIG. 9 illustrates an embodiment of a process for performing hierarchical dynamic scheduling.

FIG. 9 illustrates an embodiment of a process for performing hierarchical dynamic scheduling. In some embodiments, process 900 is performed by a hyper-kernel, such as in conjunction with the assignProcessor routine. The process begins at 902 when an indication is received that a hyperthread should be assigned. Process 900 can be invoked in multiple ways. As one example, process 900 can be invoked when a hyperthread is available (i.e., has no current work to do). This can occur, for example, when the hyper-kernel determines (e.g., at 804) that a continuation should be made. The previously blocked hyperthread will become available because it is no longer responsible for handling the computation on which it blocked (i.e., the hyperthread becomes an "anonymous shadow processor"). As a second example, process 900 can be invoked when a message is received (e.g., by the hyper-kernel) that a previously unavailable resource is now available. The hyper-kernel will need to locate a hyperthread to resume the computation that needed the resource. Note that the hyperthread that was originally blocked by the lack of a resource need not be the one that resumes the computation once the resource is received.

At 904, the TidalTree is searched for continuations that are ready to run, and one is selected for the hyperthread to resume. In various embodiments, the TidalTree is searched from the leaf-level, upward, and a cost function is used to determine which continuation to assign to the hyperthread. As one example, when a hyperthread becomes available, the continuation that has been queued for the longest amount of time could be assigned. If no continuations are waiting at the leaf level, or are outside a threshold specified by a cost function, a search will be performed up the TidalTree (e.g., the core level, then the socket level, and then the node level) for an appropriate continuation to assign to the hyperthread. If no appropriate continuations are found for the hyperthread to resume at the node level, the hyper-kernel for that node contacts the root. One typical reason for no continuations to be found at the node level is that there is not enough work for that node to be fully utilized. In some embodiments, the node or a subset of the node can enter an energy conserving state.

Time Sequence

For expository purposes, in the example, a "swapping" operation is used to transfer continuations and memory, but in fact that's not necessary in all embodiments.

FIG. 10 illustrates an example of an initial memory assignment and processor assignment. Specifically, region 1002 of FIG. 10 depicts a hyper-kernel's mapping between physical blocks of memory (on the left hand side) and the current owner of the memory (the center column). The right column shows the previous owner of the memory. As this is the initial memory assignment, the current and last owner columns hold the same values. Region 1004 of FIG. 10 depicts a hyper-kernel's mapping between system virtual processors (on the left hand side) and the physical nodes (center column)/core numbers (right column).

Suppose virtual processor P00 makes a memory request to read location 8FFFF and that the hyper-kernel decides to move one or more memory blocks containing 8FFFF to the same node as P00 (i.e., node 0). Block 8FFFF is located on node 2. Accordingly, the blocks containing 8FFFF are transferred to node 0, and another block is swapped out (if evacuation is required and the block is valid), as shown in FIG. 11.

Next, suppose virtual processor P06 makes a memory request to read location 81FFF. The contents of this block have been moved (as shown in FIG. 11) to node 0. The hyper-kernel may determine that, rather than moving the memory again, the computation should be moved. Accordingly, virtual processor P06 is moved to node 0, and may be swapped with virtual processor P01, as shown in FIG. 12.

Performance Information

Locks and Other Synchronizers

In various embodiments, the use of synchronization mechanisms like locks is minimal. Locks are used, for example, to insert queue and remove queue continuations on scheduler objects and to maintain the event table.

Code Path Lengths

In some embodiments, the (maximum) length of all code paths is determined through a static code analysis, resulting in estimable and bounded amounts of time spent in the hyper-kernel itself. All data structures can be pre-allocated, for example, as indexed arrays. The nodes of the TidalTree are determined at boot time and are invariant, as are the number of steps in their traversal. One variable length computation has to do with the length of the work queues, but even that can be bounded, and a worst-case estimate computed. In other embodiments, other variable length computations are used.

Static Storage

In various embodiments, all data structures needed in the hyper-kernel are static, and determined at boot time, so there is no need for dynamic memory allocation or garbage collection.

Physical Memory

All memory used by the hyper-kernel is physical memory, so no page tables or virtual memory is required for its internal operations (except, e.g., to manage the virtual resources it is managing), further helping the hyper-kernel to co-exist with an operating system.

Sharing Data and Maintaining Consistency

In some cases, e.g., to preserve the conceptual integrity of the virtual machine being presented to the operating system, changes in one node's data structures are coordinated with corresponding ones in a different node. Many of the data structures described herein are "node local," and either will not need to move, or are constant and replicated. The data structures that are node local are visible to and addressable by all hyperthreads on the node. Examples of data structures that are not node local (and thus require coordination) include the current resource map (or portions thereof), the root of the TidalTree, and migratory continuations (i.e., continuations that might have to logically move from one node to another).

A variety of techniques can be used to maintain a sufficient degree of consistency. Some are synchronous and assume all changes are visible at the same time to all nodes (i.e., "immediate consistency"). Others allow a more relaxed solution and strive for "eventual consistency." As mentioned above, physical nodes of an enterprise supercomputer are connected via one or more high speed interconnects. Multiple instances of hyper-kernels are interconnected to pass messages and resources back and forth between physical nodes.

Updating the Current Resource Map

Each physical node n starts off (e.g., at boot time) with the same copy of the physical resource map, the initial virtual resource map, and the current resource map. Each node maintains its own copy of the current resource map.

In some embodiments, each entry for resource r in the current resource map has the following:

1. A local lock, so that multiple hyperthreads on a physical-node cannot modify r at the same time.
2. A node number specifying the node that currently owns the resource.
3. A count k of the number of times n has requested r since the last time it owned r.
4. A boolean which when set signifies that this node n wants r.
5. A boolean which when set signifies that this node has r but is in the process of transferring it, in which case the node number specifies the new owner.

In some embodiments, the count k is used to deal with unbounded chasing of resources. If k exceeds a threshold, a determination is made that it is better to move the newly built continuation rather than chasing the resource around the system.

The following is an example of a mechanism for initiating migration of resources and receiving resources. Key transactions include the following:

1. Node n sends a request for resource r to n'.
2. Node n' receives a request for resource r from n.
3. Node n' may send a "deny" message to n under certain circumstances, otherwise it can "accept" and will send the resource r.
4. Node n will receive a "deny" message from n' if the resource r cannot be sent by n' at this point in time. It may be that r is needed by n', or it may be that r is being transferred somewhere else at the arrival of the request. If the request is denied, it can send a "forwarding" address of the node to which it's transferring the resource. It may be that the forwarding address is n' itself, which is the equivalent of "try again later." When node n receives the deny message, it can resend the request to the node suggested by n', often the new owner of the resource. To avoid n chasing the resource around the system, it can keep track of the number of attempts to get the resource, and switches strategy if the number of attempts exceeds a threshold.
5. Node n will receive the resource r if n' can send the resource. In this case, n needs to schedule the continuation c that was awaiting r, so that c can be resumed.

TidalTree Root

In some embodiments, one physical node of the set of nodes in the system is designated as a "master node." This node has the responsibility at boot time for building the initial virtual resource map and other data structures, replicating them to the other nodes, and booting the operating system (e.g., Linux). The master node can be just like any other node after the system is booted up, with one exception. At least one physical node needs to store the root of the TidalTree. The master node is one example of a place where the root can be placed. Updates to the event queue of the TidalTree root scheduling object are handled in each node by sending a message to the master node to perform the update.

Over time, the hyper-kernel will adapt and locality will continually improve if resource access patterns of the operating system and the application permit.

Continuations

As explained above, physical memory addresses across all nodes are not unique. In some embodiments, the inclusion of physical memory addresses in continuations can be avoided by using partitioned integer indices to designate important data structures in the hyper-kernel. In the event an addresses needs to be put into a continuation, care is taken in the move, since the address is a physical address of the source, and bears no relationship with the physical address in the destination. Moving a continuation means copying its contents to the destination node as discussed above, and remapping any physical addresses from the source to the target.

Timestamps

In some embodiments, access to a free-running counter is visible to all of the nodes. In the absence of this, free-running counters on each node can also be used. Counters in continuations are mapped between the source and destination.

Handling of Disks and Persistent Flash

Where a needed resource is on disk (or persistent flash), in some embodiments, such resources are treated as having a heavier gravitational field than a resource such as RAM. Accordingly, disk/flash resources will tend to not migrate very often. Instead, continuations will more frequently migrate to the physical nodes containing the required persistent storage, or to buffers associated with persistent storage, on a demand basis.

Operating System Configuration

There are many ways to configure an operating system. For servers, an assumption can be made that its operating system is configured to only require a small set of resource types from the virtual machine implemented by the hyper-kernel: storage that includes linear block arrays, networks, processors, memory, and internode interconnects. As a result, the complexity of the operating system installation can be reduced.

Example Data Structures and Functions

The following section provides a list of examples of data structures and functions used in various embodiments.

init-continuation: Initializes a continuation when a computation is stalled.

assignProcessor: Routine that assigns a new continuation to a shadow processor (if possible).

on-stall(r): Stalling event occurs for resource r.

migrate-computation(computational-state,r,n): Message to request migration of a computational state to another node n which you hope has resource r.

on-interrupt(i): Software interrupt i occurs.

handle-event(e): Routine executed when the hyper-kernel is called on to handle an asynchronous event.

request-resource(r,n): Request transfer of resource r from node n.

initiate-send-resource(r,n): Start sending resource r to node n.

on-request-transfer-response(r,n,b): The requested transfer of r from n was accepted or rejected. b is true if rejected.

on-transfer-requested (r,m): Receive a request from m for resource r.

on-resource-transferred(r,n): Ack of resource r has been received from n.

on-receive-resource (r,n): Resource r has been received from n.

migration-continuation(r): True if and only if it is better to migrate a continuation than move a resource.

parent(s): Returns the parent scheduler-object of scheduler object s.

cost(s,c): Used to evaluate placement of continuation c in the wait-queue of scheduler-object s.

find-best-within(s): A cost function that returns a continuation stored in the wait-queue of scheduler-object s.

conserve-energy: Enter low power mode.

resume-continuation(c): Resume the computation represented by c in the processor executing this function at the point.

valid(i): Boolean function that returns true if and only if interrupt i is still valid.

initialize(best-guess): Initializes cost variable best-guess.

insert-queue(s,c): Insert continuation c into the wait-queue of scheduler-object s.

return-from-virtual-interrupt: Resume execution that was temporarily paused due to the interrupt.

r.owner: Returns the node where resource r is local.

r.e: Resource r is awaiting this event.

e.r: This event is for resource r.

e.continuation: When this event occurs, need to resume continuation.

get-state( ): Returns processor's state.

scheduler-object(p): Returns scheduler-object currently associated with processor p.

on-request-transfer-response(r,m, response): Response to request of transferring resource r from node m. Response can be either true if "rejected" or false if "accepted."

Example Routines

The following are pseudo-code examples of routines used in various embodiments. In the following, functions that start with "on-" are asynchronous events or messages coming in.

```
==========================
init-continuation(computational-state)
==========================
/* InitContinuation by processor p awaiting resource r with hints h */
c = allocate continuation
c. state = computational-state
c.last = scheduler-object(p)
c. state = waiting-for-event
c.hints = h
e = allocate event in event-table
e.resource = r
e.continuation = c
return c
end InitContinuation
==========================
assignProcessor
==========================
/* Once processor p in physical node n becomes a shadow processor, it gives up
its O/S identity and starts looking for a continuation with which to resume execution.
p will look for such a continuation in wait-queues as follows: */
   s = scheduler-object (p)
   initialize (best-guess)
   best-s = nil
   /* traverse upwards, keeping track of best candidate */
   /* assume there is a locally cached copy of the root */
   repeat
      guess = cost (s)
      if guess > best-guess
      then
         best-guess = guess
         best-s = s
      s = parent (s)
   until s = nil
   if best-s <> nil
   then
      c = find-best-within (best-s)
      resume-continuation (c)
   else conserve-energy
end assignProcessor
==========================
on-stall(r)
==========================
/* OnStall is invoked when the hardware detects an inconsistency between the
virtual and physical configurations. More specifically, node n requests resource r which the
hardware cannot find on node n. */
   if migration-continuation (r)
   then
      /* send the computation to node n */
      nn = owner(r)
      /* node n believes resource is probably at node nn */
      migrate-computation (r,nn)
   else
      /* request the resource r */
      c = init-continuation(get-state( ))
      /* insert code here to insert c into the local event-table */
      request-resource(r, owner(r))
      assignProcessor /* At this point, p is an anonymous shadow processor */
                     /* p needs to find some work to do */
   end OnStall
==========================
```

```
on-migrate-computation(computational-state, r,n)
==========================
    /* the remote node gets the message from n to receive a continuation.
Note: c in this case is the contents of the continuation, not the continuation itself */
c = InitContinuation /* with the information in the request */
c.state = computational-state
e = insert c into the local event-table
handle-event (e)
end on-migrate-computation
==========================
on-interrupt(i)
==========================
/*When a processor p (in subtree of physical node n) is interrupted by i (using a
very low level mechanism specific to the particular hardware design), p does the following: */
    while valid (i)
        e = event-table (i)        /* find the event corresponding to i */
        handle-event (e)
        i = next-queued-interrupt
    end while
    /* resume prior execution */
    return-from-virtual-interrupt
end on-interrupt
==========================
handle-event(e)
==========================
/* An event occurred. Move it from the event table to the best scheduler-object. */
c = e.continuation        /* find the continuation for event e */
event-table (i).clear = true   /* remove the event from the table */
e.complete = true         /* mark e as completed */
c.state = ready
/* now find out the best place to put c */
s = c.last
initialize (best-guess)
/* look for best choice */
/* assume there is a locally cached copy of the root */
repeat
    guess = cost (s,c)
    if guess > best-guess
    then
        best-guess = guess
        best-s = s
    s = parent (s)
until s = nil
insert-queue (best-s,c)/* queue up c in the wait-queue of best-s */
end handle-event
==========================
request-resource (r,n)
==========================
/* When a node n needs a resource r owned by node n' the resource is requested,
but the request may not be satisfied because someone else might have beaten you to request
it or n' is currently using it. */
    current-resource-map(r).wanted = true
    request-transfer(owner(r),r) /* send a request to the owner of r */
                                 /* requesting r's transfer */
    return
==========================
on-request-transfer-response (r, m, is-rejected)
==========================
/* Now, consider that you are a node getting a response from a previous request to
a node for a resource r. When the response to this request comes in, it can be accepted or
rejected. */
if is-rejected
then /* resource has been transferred to m */
    increment k
    if k > threshold
        then
            /* you don't want to go chasing around forever*/
            /* trying to get the resource. Give up */
            migrate-computation(r,m)
            return
        else
            request-transfer(r,m) /* try again */
            return
    else
        /* request was not rejected and r is the resource */
        r.k = 0
        r.wanted = false /* resource has been moved */
        r.owner = me    /* set the owner to n (i.e., "me") */
        if the resource is memory,
```

```
        update the hardware memory map with the new memory
    return
==========================
on-transfer-requested (r,n)
==========================
/* When a resource request for r comes from node n, if transfer in progress to
owner(r), deny the request */
if r.being-transferred
then
    send-request-response (r, owner(r), true)
else
    /* transfer of resource is accepted */
    r.transferring = true
    initiate-send-resource(r)
    if type(r) = memory
    then update local memory map
    send-request-response (r, owner(r), false)
return
==========================
on-resource-transferred (r,n)
==========================
/* When an acknowledgement comes in that the transfer is complete */
r.owner = n
r.transferring = false
return
==========================
on-receive-resource(r,n)
==========================
/* Now we receive a message with the requested resource r from n*/
r.k = 0
r.wanted = false/* clear the bit saying that it's wanted */
r.owner = me /* set the owner to n (i.e., "me") */
if the resource is memory,
    update the memory map with the new memory
send-resource-transferred(r,n)
handle-event(r.e) /* the even we've been waiting for has occurred */
return
```

Network Attached Memory Using Selective Resource Migration

Described above are example embodiments of a hardware and software architecture in which a series of tightly coupled cluster of servers (also referred to herein as a "TidalPod") share an aggregated set of resources. These resources include several types, such as processors, dynamic memories, storage, and networks. The aggregation of these resources by a hyper-kernel in such a system allows for the construction of a virtual machine that spans the set of nodes and appears to an operating system and to applications as a single large server.

Described herein are techniques for extending aggregation of resources by a hyper-kernel to include memory technologies such as flash memory, PCM (phase change memory), 3D-XPoint, hard disk drives, etc. While example embodiments involving flash memory are described below, the techniques described herein can variously be adapted to accommodate any type of memory technology, as applicable.

In one example embodiment, flash memory is organized as a physical array of bytes. Each byte of this array corresponds to a physical memory address in the virtual machine created by the set of hyper-kernels running on each server (also referred to herein as "nodes") of the cluster.

Typically, flash memory is used in two main ways: as solid-state disks (SSD) or as persistent memory in portable electronic devices such as mobile phones and tablets. One example primary usage for flash in servers is to simulate disks. Described herein are techniques that provide additional ways of using flash, for example, as a persistent backup memory to (a) make large memories available for use by applications and databases by extending the size of the memory as perceived by a guest operating system beyond that of the sum of the available dynamic memory of the cluster and (b) as a way to make systems more resilient in the presence of errors.

Unfortunately, most system software for servers typically have no mechanism to effectively deal with flash as a first class element of a memory hierarchy, and as a result, this software resorts to using it in a way that it understands well, namely disk storage.

Example Use Cases

The following are several example use cases supported by the techniques described herein:

1. Consider, for example, a software-defined server with 5 TB of main memory, and consider a flash memory array of 10 TB. In one example embodiment, the server is configured to have 10 TB of main memory, and to the 5 TB of main memory as a new cache of the 10 TB of flash memory. The use of such a cache accelerates the system.

2. In an alternative embodiment, the flash memory array may be used as if it were additional main memory for a total of 15 TB of main memory.

3. In another example embodiment, the flash memory can be used to implement a persistent reference memory. For example, if a system detects an impending failure, the contents of the flash memory may be updated with the most recent pages of main memory that it does not already have. In this way, when the system restarts, the persistent memory can be used to help restore the system to the previously saved state (e.g., analogous to what is done when a laptop suspends/resumes). Thus, the main memory can be backed up to persistent storage so that the system can be restarted easily in the event of a crash, error, or other failure.

For example, typically, in the event of a failure (e.g., detection of a power failure or system crash), a snapshot of dynamic memory such as DRAM (dynamic random access memory), which is volatile (e.g., the contents of the volatile memory are lost when power is removed), is taken and is written to disk. This can be avoided using the techniques described herein, as a reference copy can be stored or flushed to a network attached memory that includes persistent (e.g., static, non-volatile) memory such as flash memory. Details regarding a network-attached memory will be described in further detail below.

4. In another example embodiment, the techniques described herein may be used to save the state of a node and replace it with a different one. This may be done for various reasons, such as upgrading of a node, replacing a failing node, etc.

Memory Hierarchy

In the example architecture presented above, a large "physical" address space is presented to a guest operating system. From the point of view of each node in the cluster, there are addresses in that "guest physical" address space as seen by the operating system whose guest physical addresses are directly addressed by the processors on that node. In some embodiments, if the guest physical address requested by a processor is not present on that node, a memory access fault is generated by the hardware, and either (a) the memory that contains that address is moved or copied to the node where the processor is located, or (b) the computation the guest processor was executing (i.e. the virtual processor representing the guest processor) is moved to the node where the guest physical memory is located. Examples of resource migration mechanisms and techniques using a hyper-kernel are described above. Either of these two strategies, once completed, enables the computation to be made available to be scheduled and, once scheduled, ultimately begins to run again, as if the memory access fault never happened.

In some embodiments, in this model, at any given time, the "guest physical" memory is owned by at most one node in the system. Other nodes may have copies of this memory, but, in some embodiments, in order to maintain strong cache coherency, when a guest processor modifies the page, either all the other copies must be marked as invalid, or otherwise forgotten.

In some embodiments, each page of dynamic memory in the system can be a local copy of some other memory, i.e. an alternate flash memory or a networked attached flash memory. This flash memory may be centrally located in a flash appliance accessible to all of the nodes in the cluster, or it may be distributed in parts throughout the cluster, on one or more nodes (e.g., on PCI cards including flash memory on one or more nodes).

Such an array of flash memory is referred to herein, without loss of generality, as a "network-attached memory." The network-attached memory (also referred to herein as a "NAM") may be composed itself of one more banks of memory distributed amongst the nodes of the cluster. In various embodiments, the network-attached memory can be implemented using memory technologies, such as PCM, 3D-XPoint, hard disk drives, etc., as described above, with the techniques described herein variously adapted, as applicable. An example of a network-attached memory is described in further detail below.

The network-attached memory can be used as an additional layer of memory in a TidalPod. In one example embodiment, the network-attached memory can be considered as the "real" home of all memory in the system (e.g., TidalPod). When the network-attached memory is considered or used or configured in this manner, then parts of the network-attached memory may temporarily reside on each node, for example, in the dynamic memory of the node. When considered in this way, the memory in each node can, in some embodiments, be used as a cache of the network-attached memory.

An example of a network-attached memory appliance is described in further detail below in conjunction with FIG. 14.

In various embodiments, the normal memory hierarchy is thus extended from only having cache levels on each node to having cache levels across tightly coupled nodes.

One example result of the techniques described herein in utilizing a network-attached memory is that the memory of the network-attached storage can greatly extend the available dynamic memory of the cluster, for example, due to an example requirement that the amount dynamic memory of the cluster be in 1:1 correspondence with the virtual machine being presented to the operating system, not necessarily the sum of the all the physical primary memory on each node.

Strong Cache Coherency

In some embodiments, in order for the operating system and applications to properly function, the entire memory hierarchy must be strongly cache coherent. In typical hardware, processors maintain strong cache coherency synchronized using one or more levels of hardware caches. When more than one processor exists on a node, using existing hardware, cache coherency is maintained via an on-board interconnect such as AMD's Hypertransport™ or Intel's QuickPath Interconnect™.

However, those schemes do not extend beyond a single node (i.e., a node having processors and memory). Described herein is a software version of a strong coherency protocol that uses the mechanisms described above to achieve a similar effect.

In some embodiments, when a processor running under the direction of an operating system writes to a location in its local memory, if a copy of that memory is stored in a hardware cache of a processor on that node, the processors must cooperate to maintain the strong consistency of the local caches.

Using the techniques described above (e.g., the hyper-kernel described above), a similar action can be taken. For example, when a guest virtual processor running under the direction of a guest operating system writes to a location in what it believes to be its local memory, if that memory is in the dynamic memory of the node, care must be taken to make sure that any other node having a local copy of that memory invalidates it's local copy, so that one true copy is maintained in only one place in the guest virtual machine. When memory is extended to a network attached memory, the same write should have the same effect.

Migration to and from Network-Attached Memory

Described herein is an overview of how to maintain strong cache coherency in the presence of networked attached memory. Additional details are described below.

In some embodiments, when a computation on a node attempts to read from a location that is stored and owned on another node, the resource migration algorithms such as those described above are executed to make sure that the computation and the memory are co-resident on the same node, either by moving the computation, or by moving the memory.

Techniques for extending resource migration to incorporate a network-attached memory flash appliance are described below.

In some embodiments, the set of nodes in a TidalPod that contain memory is extended to include the flash appliance. The flash appliance is treated as another distinct resource type in the system. The flash appliance can be thought of as similar to the other nodes except that, in some embodiments, it does not have any virtual processors on which computations can be scheduled. In some embodiments, the network-attached memory appliance does not start off with any virtual processors, and never accepts any virtual processors from other nodes in the TidalPod.

Figure 13A:
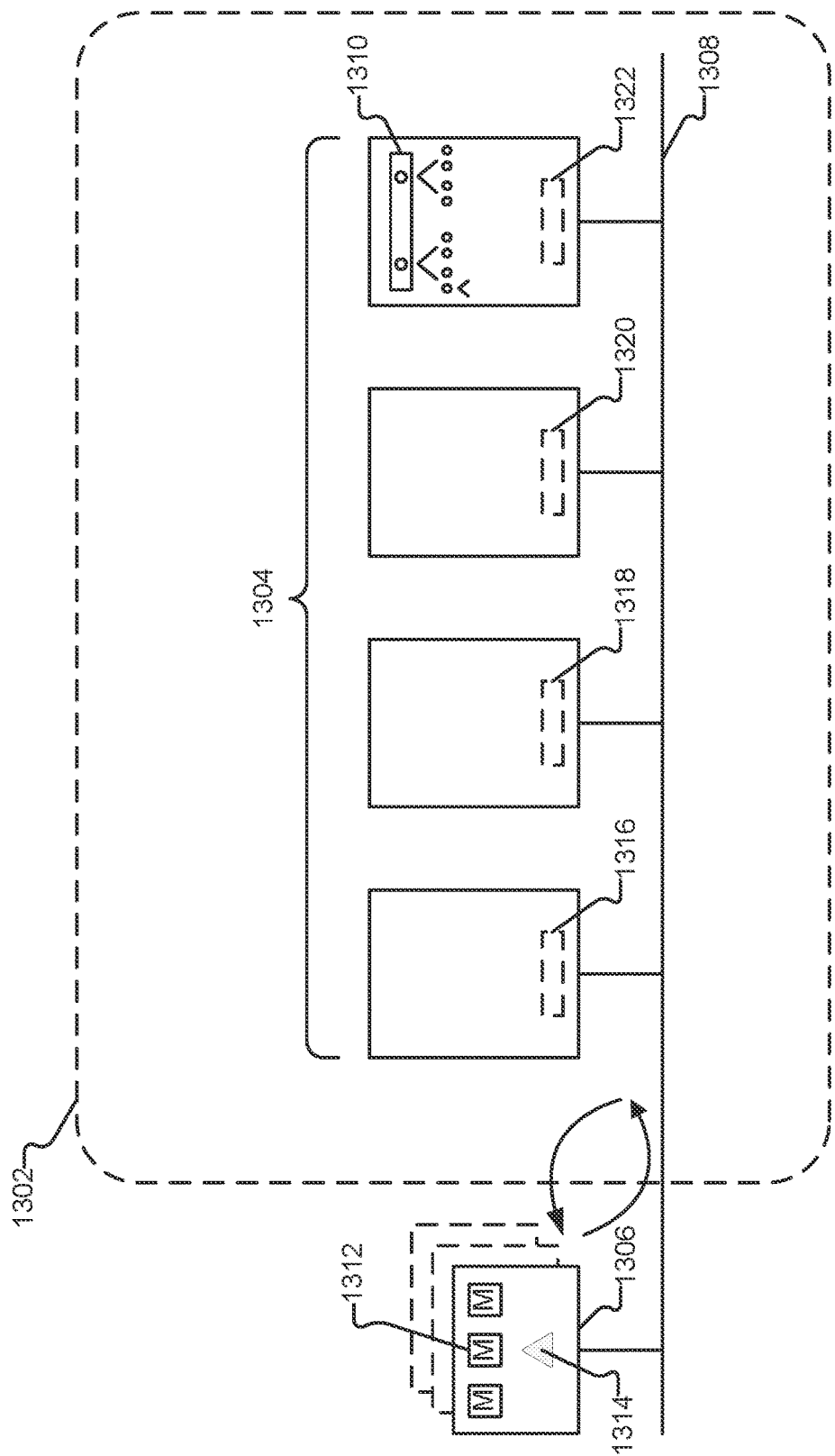
FIG. 13A illustrates an example embodiment of a system in which a network attached memory is used in selective resource migration.

FIG. 13A illustrates an example embodiment of a system in which a network attached memory is used in selective resource migration. In the example shown, nodes 1304 (examples of nodes 458-462) of TidalPod 1302 communicate with a persistent memory array 1306 (example of a network-attached memory). In some embodiments, the nodes and NAM together form the TidalPod (where the NAM is a specialized node in the TidalPod). In some embodiments, the nodes and the NAM of the TidalPod communicate with each other over an interconnect (1308).

In one example embodiment, each of nodes 1304 includes a motherboard (1310), where the motherboard may have a number of processors, where each processor may have a number of cores, and each core may have a number of hyperthreads, as described above. In some embodiments, the guest operating system running on the TidalPod views each hyperthread as a processor.

In some embodiments, the network-attached memory 1306 is an array of memory (1312) (e.g., bytes of flash memory). The NAM also includes a processor (1314) configured to implement a cache coherency protocol, as described herein. Multiple NAMs may be used for redundancy and/or resiliency. In this example, the network-attached memory appliance 1306 is centrally located in a flash appliance accessible to all of the nodes in the cluster. In other embodiments, the network attached memory may be distributed in parts throughout the cluster, on one or more nodes (where examples of portions of the NAM distributed across nodes 1304 are shown at 1316-1322).

Using the techniques described herein, pages of memory may be placed in the NAM, just as pages of memory can be put on any node in the system, as described above (e.g., when performing memory migration). In some embodiments, the network-attached memory appliance communicates with the other nodes in the TidalPod over the interconnect using a cache coherency protocol, which will be described in further detail below.

Figure 13B:
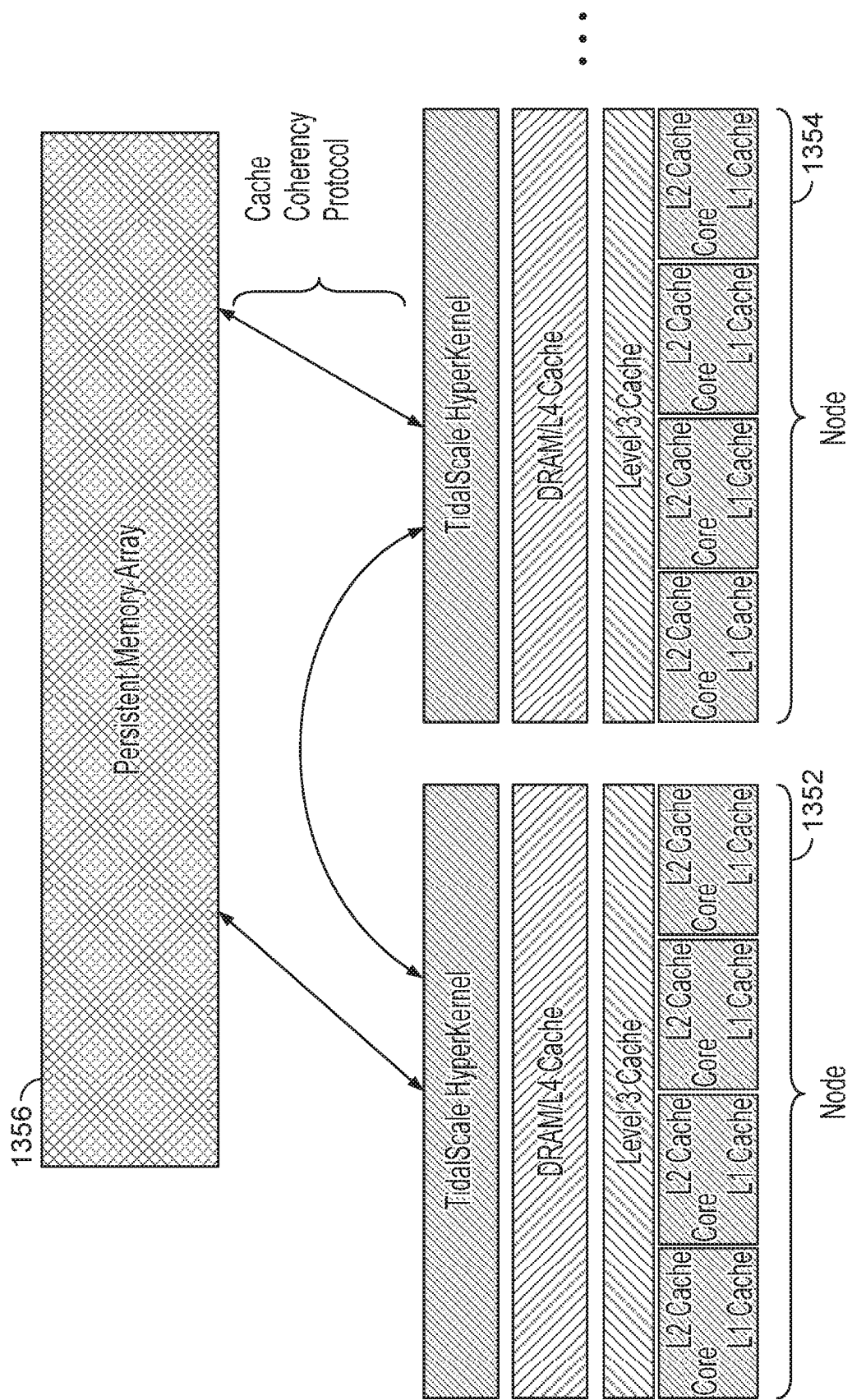
FIG. 13B illustrates an example embodiment of a system in which a network-attached memory is used in selective resource migration.

FIG. 13B illustrates an example embodiment of a system in which a network-attached memory is used in selective resource migration. In this example, nodes 1352 and 1354 are examples of nodes 1304 and 458-462. As shown in this example, each node has a hyper-kernel. Also shown, is an example embodiment of a memory or cache hierarchy on each node, which include L1, L2, and L3 caches. Each node also includes DRAM, used as an L4 cache.

As shown in this example, nodes 1352 and 1354 communicate with each other (e.g., over an interconnect), for example, migrating resources between each other. In this example, the nodes are also configured to communicate with persistent memory array 1356, which is an example of a network-attached memory. The NAM and the nodes of the TidalPod communicate using a cache coherency protocol, described in further detail herein.

Figure 14:
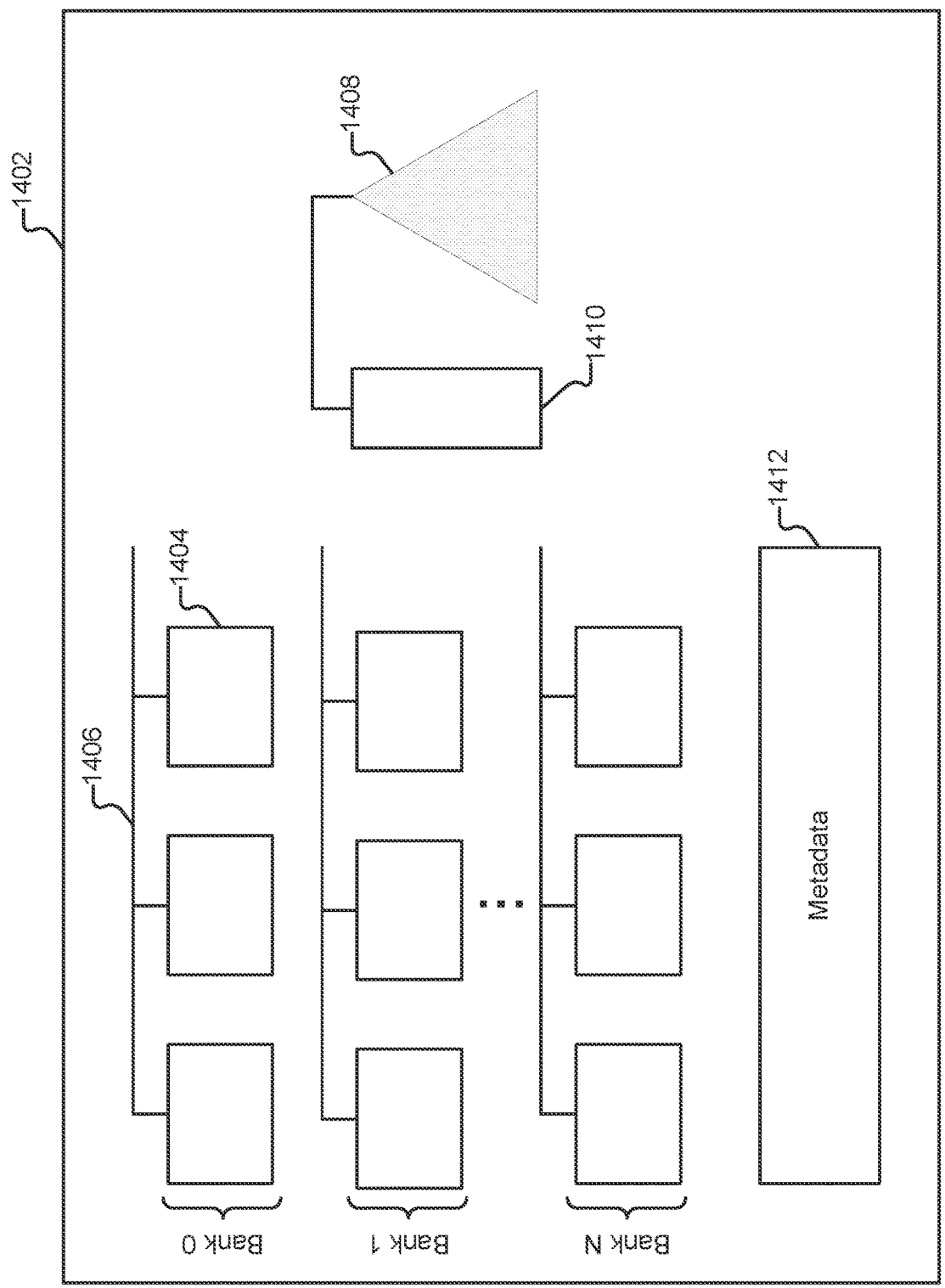
FIG. 14 illustrates an example embodiment of a network-attached memory appliance.

FIG. 14 illustrates an example embodiment of a network-attached memory appliance. One example implementation of a NAM is as follows. The NAM (1402) includes a number of flash memory chips (e.g., memory chip 1404) arranged in a 2D (two-dimensional) array on a board. In this example, the memory chips are arranged in banks and rows. The memory chips are connected on a memory bus (1406). The memory bus allows a processor (1408) to put out addresses to a memory controller 1410 (e.g., address specifying bank X, chip Y, page Z), which is then configured to return the appropriate page from the specified combination of bank/chip. For example, the memory controller takes the total number of chips, divides that by the number of pages on a chip, divided by the number of rows, etc. to return the appropriate page.

In this example, the processor included in the NAM is a coordinator, implemented, for example, as a special limited processor, a network processor, or a protocol processor that is configured or programmed to communicate with other nodes in the TidalPod, for example, receiving messages and providing responses as part of a cache coherency protocol, which will be described in further detail below. In some embodiments, the messages include acknowledgments, retries, etc. that are communicated between nodes of a TidalPod. One example of a message is a message to migrate a vcpu on node n to a node m. Example pseudocode for such a message is provided below:

Migrate this VCPU "V" to node M
Snapshot the state of V (typically a small number of pages of memory (e.g., ~6400 bytes))
Send "migrate" command with the appropriate number of bytes to contain the state V to M (e.g., 6400 bytes)
Wait for Acknowledgment Additional examples of messages and an example message structure will be described in further detail below. In some embodiments, the processor included in the NAM is invisible to the guest operating system.

In this example, the NAM also includes metadata 1412. In some embodiments, the metadata includes page state data used to keep track of which pages are in what state. In some embodiments, the page state data indicates the type of the page (e.g., secondary). In some embodiments, the NAM includes metadata that indicates the state of the page on various nodes throughout the TidalPod. For example, the state of the copy of the page on the NAM is typically a secondary. Copies of the page on other nodes may be secondary, prime, or exclusive. This information can be used, for example, when performing a recovery in a fail over scenario, to restore the state of the TidalPod (e.g., to indicate that a copy of the page on a first node in the TidalPod should be marked as primary (also referred to herein as "prime"), while another copy of the page on a second node should be marked as secondary).

In some embodiments, all pages of the NAM are initially invalid (e.g., on startup of a TidalPod). When a page is written into on a node, a copy of the page is sent to the NAM according to a page/cache coherency protocol described in further detail below. Thus, over time, as pages are created and written on the TidalPod, the NAM maintains a recent copy of all those pages that are created and written (e.g., a copy of the dynamic memory).

In some embodiments, when a large memory system is started up (e.g., large memory Linux or FreeBSD system), typically a zeroing of the pages is performed. This process may take a long amount of time for large memory systems. In some embodiments, using the techniques described herein, the zeroing of pages can be performed more quickly and more efficiently. For example, the zeroing can be performed in parallel, and in a "lazy" fashion. In some embodiments, pages in the system that have not yet been zeroed are indicated as "dormant" pages. In some embodiments, these dormant pages are not zeroed until the first time that they are used (e.g., allocated and written into or created). A TidalPod system can boot up quickly by using this "parallel lazy zeroing" technique.

In some embodiments when the TidalPod system starts off, there are no entries in a second level page table (described in further detail below) for dormant pages, as they have not yet been created, and therefore do not yet exist (i.e., dormant pages do not have any physical representation until they are allocated). In some embodiments, when a dormant page is allocated, it is zeroed. An entry is then placed in the second level page table, which makes the page valid and non-dormant.

Figure 15:
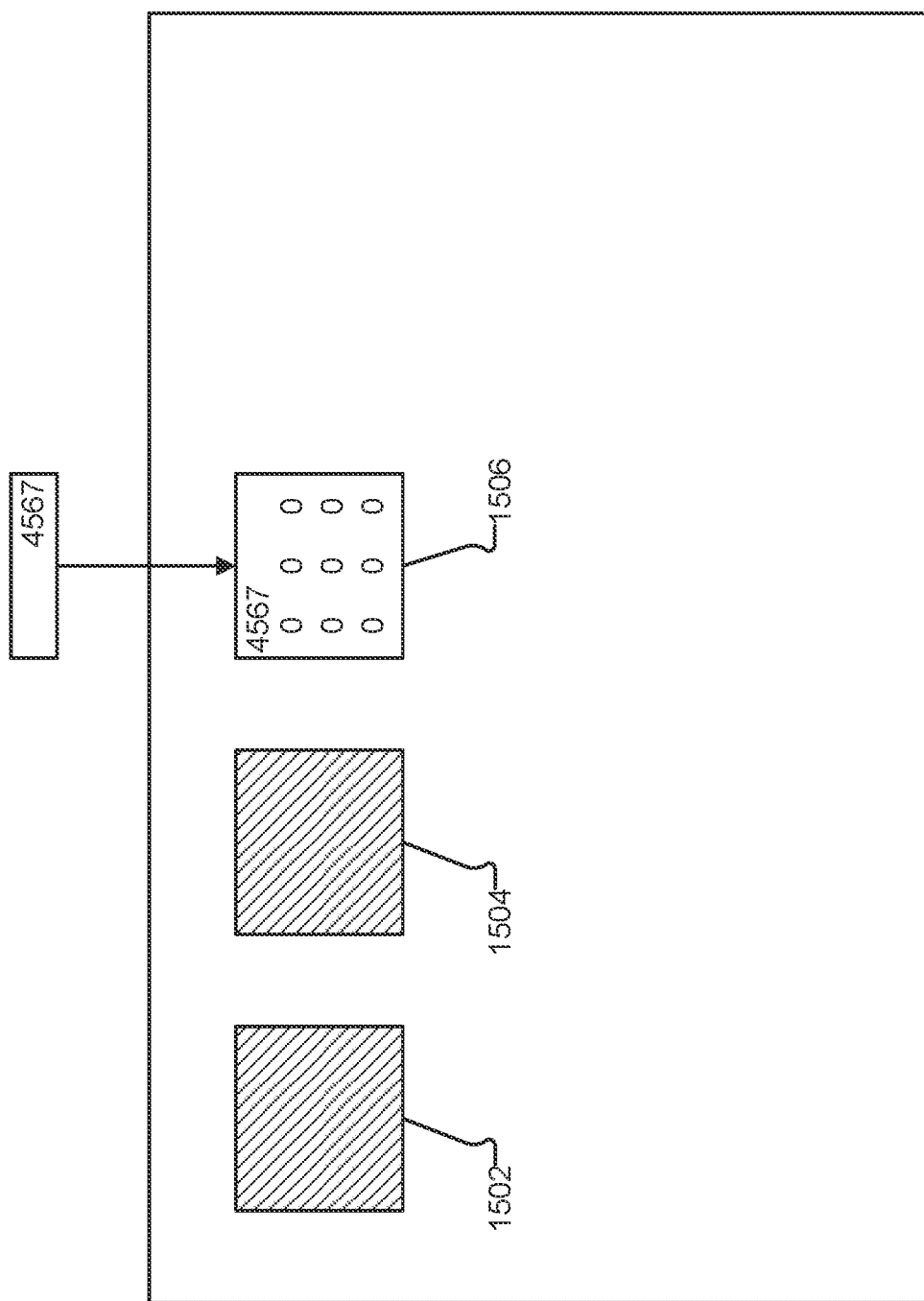
FIG. 15 is a diagram illustrating an embodiment of allocating a page.

FIG. 15 is a diagram illustrating an embodiment of allocating a page. The diagram variably applies to dynamic memory and a network attached memory. In the example shown are dormant pages (1502 and 1504). When a dormant page is allocated, it is zeroed out (e.g., as shown at 1506). An entry is then placed in a second level page table, as described above. When the entry is made, the physical address of the page is entered. In some embodiments, mode bits are also entered for the page. The mode bits can indicate that the page is valid, whether the page is writable or read-only, etc.

In some embodiments, when a system such as a TidalPod starts up, all pages are empty (e.g., dormant). The guest operating system then begins allocating pages. For example, when a page is allocated, a page number (e.g., 4567) is allocated. Upon allocation, the page is zeroed out, and then its address is put in the second level page table (the page is not made visible until after it has been zeroed out). Now, if an attempt is made to address some pages that are known to the hyper-kernel as 4567, a page of zeroes will be seen.

In some embodiments, until allocation, the page does not exist. When a TidalPod with a number of nodes and processors is started up, a majority of the pages are dormant at startup time. As the pages are used, they become valid. This holds true for pages in dynamic memory as well as in the NAM.

In some embodiments, the number of pages in the NAM agrees with the number of pages that the guest operating system observes. Other copies of pages (e.g., shadow copies) of the page may exist (e.g., in a page cache), but, in some embodiments, they are not made visible to the guest operating system. There need not be a one-to-one correspondence between the hyper-kernel(s) and the NAM. However, in some embodiments, there is a one-to-one correspondence as seen by the guest operating system.

In a typical operating system, an operating system runs on a bare metal machine. As described above, using the techniques described herein, the bare metal machine is replaced with a distributed hyper-kernel, which gives the operating system the impression that it is running on a bare metal piece of hardware. This is supported by second level page tables, which exist in processors on the nodes in the TidalPod. If there is not an entry in the second level page table for a page of memory, a fault will occur when performing hardware address translation. As described above, based, for example, on cost functions, the virtual processor can be moved to the page with the memory, or the memory can be moved to where the virtual processor resides. In some embodiments, when the memory is moved, not only are the contents of the memory copied over, but the second level page table at the destination (node) is also updated. Thus, when a process on the node attempts to access the page, another fault will not occur. This provides, to the guest operating system, the appearance of a single large address space, which does not exist in hardware, but is defined and supported in software using the techniques described herein. If the request for a page is rejected (e.g., based on a message that comes into the cost function), then the processor moves to the location of the page (or both the virtual process and the page are moved to another node—i.e., post-condition, they are co-resident).

In some embodiments, when a page is requested, the page is requested from its primary location. That page is then marked as secondary, while the page sent to the requesting node is marked as exclusive or prime on the requesting node.

Consider the following example. Suppose that a TidalPod includes, for illustrative purposes, a centralized network-attached memory, and two nodes, node1 and node2. In some embodiments, when a strategic decision is made to have node1 request the transfer of memory (i.e., page of memory) whose latest copy is on node2, node2 first sends an invalidation of that memory to the network-attached memory, along with an indication that node1 is most likely the place or location that the latest copy can be found, and then satisfies node1's request by sending a copy of that memory to node1. In some embodiments, the memory now on node1 is updated as dictated by the various computations resident on node1, and then when node1 must transfer that memory somewhere else, node 1 may also update the network-attached memory to where the current version of that memory may be found. In some embodiments, the system (TidalPod) continues to work or function whether or not the update is made to the NAM, since knowledge of the system may not be perfect. In some cases, due to asynchronicity, memory pages may need to be "chased down" and searched for, because they may not be in a location where they were expected to be (e.g., according to a resource map). For example, at one point in time, the page may have been at a given location, but may no longer be there when the search for the page is made.

If another node needs a copy of that memory (page), a copy is sent to the requesting node, and a copy of that memory is also sent to the networked attached memory.

In some embodiments, when memory is modified on a node, the memory becomes exclusive to that node. In some embodiments, all other copies must become invalid, including any copy on the networked attached memory.

In some embodiments, on a periodic basis, the network-attached memory may request a secondary copy of every memory page. On planned or unplanned shutdown, if there is sufficient time, the network-attached memory may request exclusive ownership of all pages, after guest virtual processors are stopped.

In this way, the network-attached memory always contains a sufficiently recent copy to preserve the semantics of strong coherency.

Description of State Transitions and Cache Coherency Protocol

As described above, the network-attached memory ("NAM") may be another node in a TidalScale Pod (centralized node or distributed across other nodes in the pod), with the exception that no virtual processors (also referred to herein as "vcpu's") can be started on it, and to which no vcpu's can ever migrate.

In this example, the NAM is transactional in nature, given that no vcpu's are present on the NAM. There is no requirement or need to keep the contents of the NAM up to date in real time, except, in some embodiments, for well-defined synchronization points defined by the execution of the guest software (e.g. "I need this page in order to progress the computation and until I get it I cannot progress the computation"). Thus, reads and writes to the NAM can be performed in a "lazy" manner. As long as requests for pages and requests to update pages are satisfied, in order, consistent von Neumann semantics can be maintained or preserved, without having to perform then in real-time. It may also be the case that some processor families have additional constraints that must be satisfied, for example, Intel's "memory storage order" constraints.

In some embodiments, the logic to request a page, update a page, migrate a processor, invalidate read-only copies of pages, etc. is handled by vcpu's or housekeeping threads. Because the NAM does not have those, the NAM does not have to worry about these operations.

An example embodiment of a transactional structure is now described.

Pages on any node can be valid, or invalid. The validity/invalidity of a page refers to whether an entry to that page exists in some page table on a node. If they are valid, they correspond to an address that the guest operating system perceives to be a physical address, but is in reality a guest virtual address when viewed by the hyper-kernel.

A valid page p resident on a node n may be in one of several states: Prime (or primary), or Exclusive or Secondary.

1. If p is marked Prime, it is "read-only" and n is said to "own" p.

2. Nodes other than n may have copies of p, which are marked or called Secondaries. In some embodiments, if there is a secondary, it can be validly assumed that there is a prime somewhere else in the TidalPod. Similarly, if a node has a prime page, then it can be assumed that there secondaries of the page elsewhere in the TidalPod. In some embodiments, the number of secondaries is maximized so that when attempts to read those pages are made, the page data is already resident on the requesting node, minimizing time spent accessing the page data.

One example of where a secondary may be desired is when handling a set of pages that hold the code of an operating system (e.g., guest operating system). Because the code for the operating system is constant and does not change, it would be inefficient if the processors running the operating system were to fetch pages for the operating system (as this may result in a stall while the processor is waiting for the requested page). Instead, to improve efficiency and reduce stalls, secondaries can be used, where as many pages of the operating system are replicated as possible. By reducing stalls, overhead in the system is also reduced, leading to increased efficiency of the system.

Similar optimizations and efficiencies can be performed for other kinds of programs, such as those with read-only data (where pages of the read-only data are copied as secondaries to read only nodes). In some embodiments, no distinction is made between code pages of an operating system or an application that are read-only pages of memory.

As another example, secondaries can be used that have large amounts of data that do not change very often. If the memory is available to do so, as much of the read-only data can be replicated as possible to improve efficiency and reduce stalls.

3. If p is marked Exclusive on n, the page can only exist on n, there can be no other copies, and the page can be read and written into ("read-write"). In this case, there are no secondaries for p.

In some embodiments, before a page is made exclusive, an invalidation operation is performed to invalidate all other existing copies of the page. This can be used to guarantee evaluation order in existing architectures. The invalidation operation can be performed by sending out messages to all other nodes, requesting that they invalidate their copy of the page. When responses (e.g., acknowledgments) to those requests are received, the receipt of all those responses indicates that there are no other locations at which the page exists. The guest operating system can then start up again and write to the page. When the write is completed, other pages may want to have a copy of the page, and in some embodiments, a snapshot of the page can be taken and used to create new secondaries that have the updated information for the page. Thus, through the use of secondaries, it will appear to the guest operating system that the pages are local.

When a vcpu on a node m (m≠n) requests access to p from n, if that page is Prime or Exclusive, the page p currently on n is marked Invalid, and a copy of the page is then sent to m which marks p as Prime. In some embodiments, as an optimization, the vcpu on node m may mark the page p as Exclusive if the vcpu on node m knows that is what is needed.

In some embodiments, if a node has a page that is prime or exclusive, then when it receives a request to send prime or exclusive writes to that page it is converted on that node to a secondary. The right to write into that page is then transferred to the node that is requesting the page. This is an optimization that may be performed based on an assumption that the node would not be requesting the page unless the node were going to write to the page. This saves a transaction in the protocol having to be performed, increasing efficiency.

In some embodiments, if node m requests access to p from n, then node n marks its copy of p as secondary. The page p is then sent to node m. If node m marks its copy of p as exclusive or prime, then node n's copy of page p is invalidated.

In some embodiments, if a page p on node n is Prime, and is to be written into, all secondary copies must be made invalid, and only after receiving an acknowledgement that this has been accomplished, n marks p as Exclusive. For example, in some embodiments, the page cannot be written into until it is known that node n is the sole writer—that is, the page cannot be written into until the page is in the exclusive state, where the page cannot be in the exclusive state until all acknowledgments have been received indicating that there are no other secondaries (i.e., all secondaries have been invalidated). In some example implementations, this can be optimized. For example, the node that is primary for this page can initiate the invalidations. In some embodiments, the invalidations include instructions that the acknowledgements should be sent to the requestor (who is about to become primary) NOT to the current primary. In some embodiments, the requester must collect all the acknowledgements before the page can be accessed. In this way, the invalidations can proceed safely in parallel with the transfer of the page. In summary, in this example optimization, the primary initiates the invalidations, but the requestor completes the invalidation process.

The following are additional details regarding invalidations. In some embodiments, the TidalPod includes first level page tables, which perform hardware translation from the user space (e.g., guest program run in user space) to what the guest operating system believes is its physical space (i.e., the first level page table mapping translates virtual addresses into what the guest OS believes to be physical addresses). As described above, what the guest OS believes to be physical addresses are guest physical addresses managed by the hyper-kernel (e.g., hyper-kernel host addresses), which then go through another level of page address translation, in hardware (e.g., via a second level page table), where the guest physical addresses are converted or translated into true physical addresses of the pages. In some embodiments, a page is invalidated by erasing it from the second level page table. Garbage collection can then be run, or memory can be returned to a free pool, etc., as the nodes can no longer access the invalidated page of memory.

After this, all write operations to a page marked Exclusive will not generate any stalls, since they can be locally read and written into on the node, and no other copies exist (e.g., pages invalidated by erasing them from the second level page table, as described above).

In some embodiments, the NAM abides by the same protocol described above. As with any other node in the TidalPod, the NAM also has valid and invalid pages. For example:

1. All pages in the NAM start off as invalid. In some embodiments, if a page becomes valid, it is marked as secondary, because the page on the NAM cannot be written into (only read from).

2. Before a vcpu v on a node n writes to a page it must invalidate all copies of P elsewhere, including the NAM. Therefore, if the NAM has a secondary for p, p must be made invalid on the NAM, and send an acknowledgement that it has been made invalid before p can be updated, just as any other node that has a copy of p must do.

3. If a node n responds to a read request coming from a node m, m n, for a page p, where p is marked Primary or Exclusive, n marks p as secondary, and sends the page p to m, and also at (roughly) the same time, n also sends it to the NAM, which marks it as valid and secondary. Thus, in some embodiments, if a node marks a page as exclusive or primary, a copy of the page is sent to the network attached memory (and marked as secondary) so that the network attached memory has a valid copy of that page (i.e., if a node has a prime copy of the page (e.g., after writing to the page), the NAM will have a secondary copy that is valid after the write). After the page is received by m, m marks the page as Primary. As before, if the page transitions from Primary to Exclusive as would be the case for a remote write request, the Secondary copy on the NAM must be made invalid. If it is known ahead of time that the page will be marked Exclusive, the step of sending the page to the NAM can be skipped (as it would ultimately be invalidated anyway).

In this way, the NAM becomes a collection over time, of copies of all valid pages in the TidalPod. In some embodiments, each time a page is updated, an update is made to the network attached memory. Thus, over time, after a period of quiescence, the network attached memory will have a valid copy of every page in the TidalPod. Thus, even if power to the system goes out, an image of the memory will reside in the NAM. As another example, when booting, if a clean shutdown was not performed, then snapshot of the memory may be used to help restore the previous state of the system prior to the shutdown.

Finally, there is no restriction on the number of NAM's in the TidalPod. For example, there may be multiple NAMs in the system (e.g., for resiliency and/or redundancy). In some embodiments, several network attached memories can be shared between different TidalPods. As one example, a NAM appliance can be unplugged and replicated for the purposes of resiliency and/or redundancy.

For example, when data is pulled off of storage (e.g., extracted from files), it may be transformed into a local representation usable by an application or database that will operate on the data. In one example use case, once the data has been transformed and is replicated to a NAM, the NAM can be unplugged and moved to another TidalPod. Thus, the transformed data can be immediately used by the other TidalPod, saving the expensive cost of transforming the raw data first. For example, the initial load of data (e.g., from a database, streamed over the internet, read from a disk, etc.) that must then be transformed to be usable by an application running on a TidalPod that needs the data can be expensive, especially for very large files. This initial load/transformation can be skipped using the steps described above (e.g., needs only to be performed once, where the transformed data can be replicated or moved to other systems by moving the NAM).

Example State Transitions

The following is a table of example state transitions:

TABLE 1

| Operation | Old page state | Action | New Page state |
|---|---|---|---|
| local read | invalid | request page from primary or exclusive | primary |
| local read | secondary | perform the read | secondary |
| local read | primary | perform the read | primary |
| local read | exclusive | perform the read | exclusive |
| local write | invalid | request write from primary | exclusive |
| local write | secondary | request write from primary; invalidate | exclusive |
| local write | primary | invalidate; write | exclusive |
| local write | exclusive | perform the write | exclusive |
| receive read | invalid | forward to primary | invalid |
| receive read | secondary | forward to primary | secondary |
| receive read | primary | send the page | secondary |
| receive read | exclusive | send the page | invalid |
| receive write | invalid | forward to primary | invalid |
| receive write | secondary | forward to primary | invalid |
| receive write | primary | send the page | invalid |
| receive write | exclusive | send the page | invalid |
| invalidate | invalid | Ack | invalid |
| invalidate | secondary | invalidate; ack | invalid |
| invalidate | primary | N/A | invalid |
| invalidate | exclusive | N/A | invalid |

In the above example of Table 1, when a read request for an exclusive page is received, the page is sent to the requestor and the stage of the page (on the node that receives the read request) is transitioned to invalidate. In some embodiments, the transition to invalid takes into account an optimization, as described above, in which an assumption is made that the page that has been requested will be written into, and the page on the node that received the request will ultimately need to be invalidated anyway. In other embodiments, in response to a receiving a read request, the node that receives the read request transitions the state of the page from exclusive to secondary.

In some embodiments, all nodes of a TidalPod, including the NAM, abide by the above example state transition diagram for the cache coherency protocol described herein. In the case of the NAM, which does not perform computations (e.g., writes on the pages that it holds), the NAM abides by the subset of transitions associated with passive operations.

Example Messages

Figure 16:
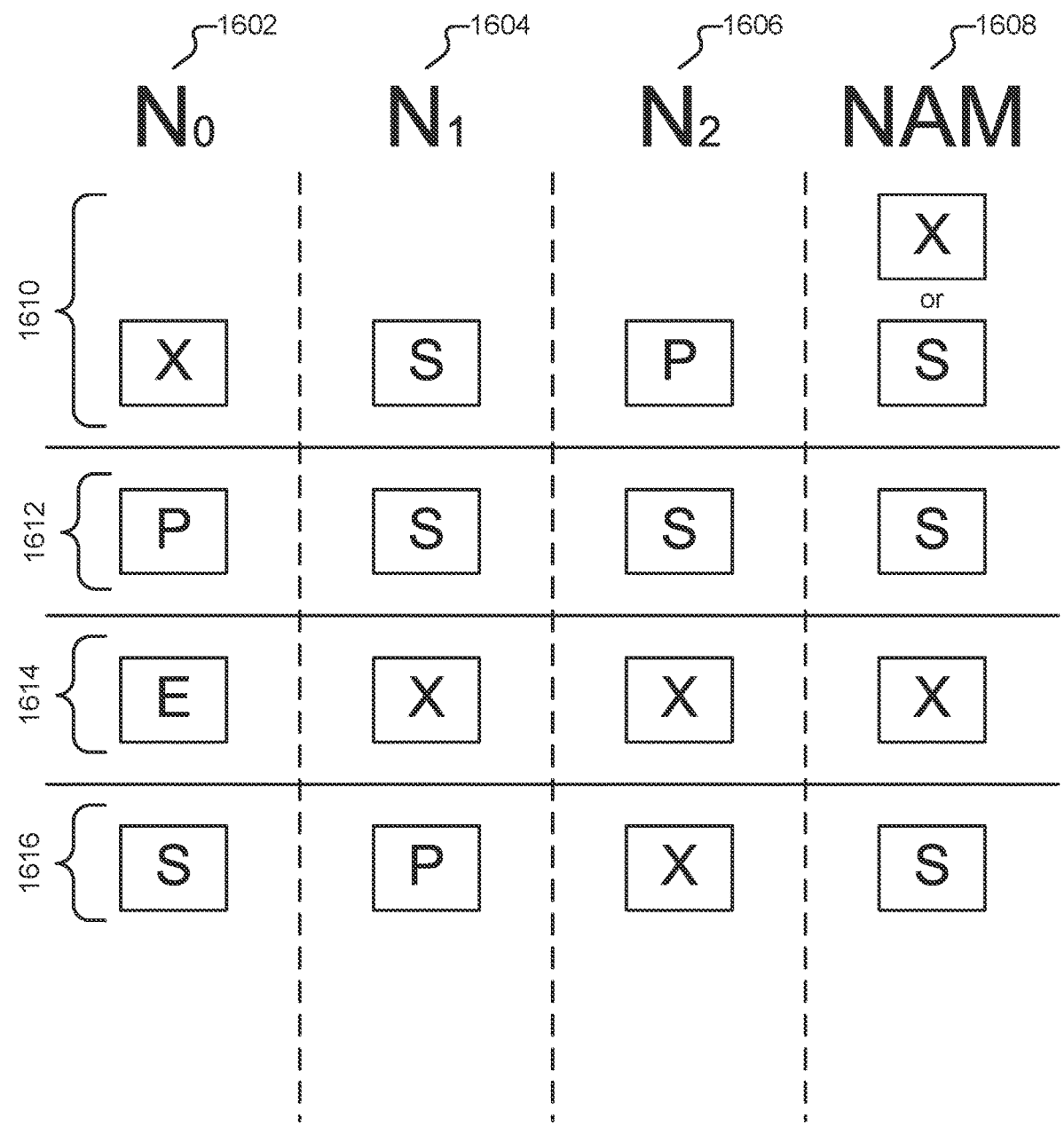
FIG. 16 illustrates an example embodiment of internode communication according to a cache coherency protocol.

The following are example of messages used in the internode cache coherency protocol described above:

In some embodiments, each subsystem has its own message types. The following are examples of subsystems in a TidalPod (e.g., scheduler subsystem, I/O subsystem, migration subsystem, etc.):

TS_NET_SCHEDULER,
TS_NET_MEMORY,
TS_NET_IO,

TS_NET_MIGRATION,
TS_NET_REMOTE,
TS_NET_REMOTE_INIT,
TS_NET_IOAPIC,
TS_NET_CONTROL,
TS_NET_BENCHMARK,
TS_PAGE_BENCHMARK,
TS_SYNC_CLOCK,
TS_NET_MMIO,

In some embodiments, the TS_NET_MEMORY subsystem has the following example message types:

VMEM_UNKNOWN=0,
VMEM_BUILD_GCPP=1, // message to node to build its cpp (coherency page protocol).
VMEM_BUILD_COMPLETE=2, // message that the build is complete
VMEM_MOVE_OWNER=3, // message carrying page from owner to owner
VMEM_COMPLETE_PAGE=4, // message used to signal page state change complete
VMEM_OK2SEND=5, // message used to broadcast available room for pages
VMEM_COLLECT_PAGE_BCST=6, // message used in isolating protocol (path where the collect message is broadcast).
GTHREAD_COLLECT_BCST=7, // message used to collect guest thread metadata
GTHREAD_COLLECT_BCST_ACK=8, // message used to respond to a guest thread collect message Example Scenario FIG. 16 illustrates an example embodiment of internode communication according to a cache coherency protocol such as that described above (e.g., according to the state transitions in Table 1, above).

In this example, suppose that a TidalPod includes nodes $N_0$ (1602), $N_1$ (1604), and $N_2$ (1606), as well as NAM 1608.

In an initial state 1610, node $N_2$ has the primary version of page p (indicated with a "P"). Node $N_1$ includes a secondary copy of page p (indicated with an "S"). Node $N_0$ does not have a copy of page p (e.g., invalid, as indicated by "X"). NAM 1608 may include either a secondary copy of page p (e.g., the system has been in use and the NAM has a reference copy of page p), or the page may be invalid on the NAM (e.g., at startup).

In a next step 1612, node $N_0$ wishes to perform a local read of page p. Because it does not have a valid copy of page p, it performs a remote read request for the page from the node that has the primary copy of page p, in this case, node $N_2$ (e.g., based on resource maps).

In response to the remote read request, node $N_2$ marks its copy of page p as secondary (transition from primary to secondary), and sends the page p to node $N_0$. Node $N_2$ also sends page p to the NAM, which marks its received copy (e.g., snapshot) of page p as valid and secondary. After node $N_0$ receives page p, node $N_0$ marks its copy of page p as primary.

In some embodiments, node $N_0$ receives a copy of page p that is marked as secondary. In other embodiments, and as shown in this example, in order to minimize the number of transactions (e.g., messages that are being communicated among nodes), node $N_0$ marks its copy of p directly as prime, under the assumption that node $N_0$ is requesting the page with the intention of writing into it. The page p on node $N_2$ is then marked as secondary. If the page p was invalid on the NAM, the page p is also sent to the NAM, where it is marked as a secondary. If the page exists on the NAM, it remains secondary. The copy of page p on node $N_1$ remains secondary.

In a next step 1614, node $N_0$ performs a local write into its primary copy of page p. Before node $N_0$ can write into or update its copy of page p, all secondary copies of page p are made invalid. For example, invalidation messages are sent to $N_1$, $N_2$, and the NAM (i.e., other nodes in the TidalPod that have secondaries of p are requested to invalidate their copies of page p). After node $N_0$ receives acknowledgments from $N_1$, $N_2$, and the NAM indicating that they have invalidated their copies of p (i.e., no other copies of p exist in the TidalPod), where the invalidation on those nodes is indicated by the symbol "X"), node $N_0$ can then mark its copy of page p as exclusive (e.g., transition from primary to exclusive) and write into its copy of page p.

In the above example, node $N_0$ first performed a remote read request at 1612 and then subsequently performed a local write at 1614. If it is known ahead of time that the page on node $N_0$ was to be marked exclusive (e.g., similar to a remote write request), the step of sending the page p to the NAM from node $N_2$ in 1612 may be skipped.

Now suppose at 1616 that $N_1$ attempts to perform a local read of page p. However, its copy of page p is invalid. Node $N_1$ then requests the page p from node $N_0$. In response to the remote read request, node $N_0$ transitions its copy of page p to secondary (or in some embodiments invalidates its exclusive copy of page p if the requestor is expected to write into p), and sends page p to node $N_1$. Node $N_1$ marks its received copy of page p as primary. Node $N_0$ also sends a copy of page p to the NAM, which marks its copy of page p as valid and secondary.

As shown in the example above, a page may be in different states on different nodes of a TidalPod. In some embodiments, a parallel data structure is used to maintain the metadata about the state of pages on various nodes in the TidalPod. In some embodiments, the structure is maintained such that re-computation of the state of pages across nodes in the TidalPod need not be performed.

In this example embodiment, the NAM is passive, and is not configured to request pages and write into them. The NAM, over time, builds up a set of secondary pages. If a node attempts to write into a page, the copy on the NAM becomes invalid.

In some embodiments, the NAM is notified, using the cache coherency protocol, of any transition from primary or exclusive to secondary (i.e., the NAM is copied on those transitions). Thus, the NAM is updated any time a page transitions from being exclusive or prime to secondary. If a page p on a node N becomes secondary, then the page on the NAM must also be updated to become a secondary. Thus, the NAM preserves the state of a set of pages that it believes are valid, and, in some embodiments, the NAM has the "ultimate" reference copy (or an approximation) of the official memory of the TidalPod.

In some embodiments, if it is detected that the TidalPod is failing or coming down, then the NAM makes read requests for copies of all primary pages in the TidalPod, which the NAM does not already have, which will be marked as secondary on the NAM. Given sufficient time, this will result in the NAM having all secondary copies of the pages on the nodes in the TidalPod (and becoming, for example, an "ultimate reference copy"). As one example, suppose that a failure or error is detected. The NAM searches through all of its pages to determine which pages are invalid. The NAM attempts to make them valid by making a read request for copies of those pages from other nodes in the TidalPod. If copies are obtained from other nodes, then the NAM updates its invalid page with the obtained copy of the page, which is then made valid and secondary on the NAM.

In some embodiments, the NAM includes backup systems, such as batteries on the motherboard that allow the NAM to continue to function, for example, during a system shutdown or loss of power. This provides the NAM with time to request secondary copies of pages on other nodes in the TidalPod (to transition from an invalid page to a valid secondary). This allows the NAM to complete itself in a failure situation.

Figure 17:
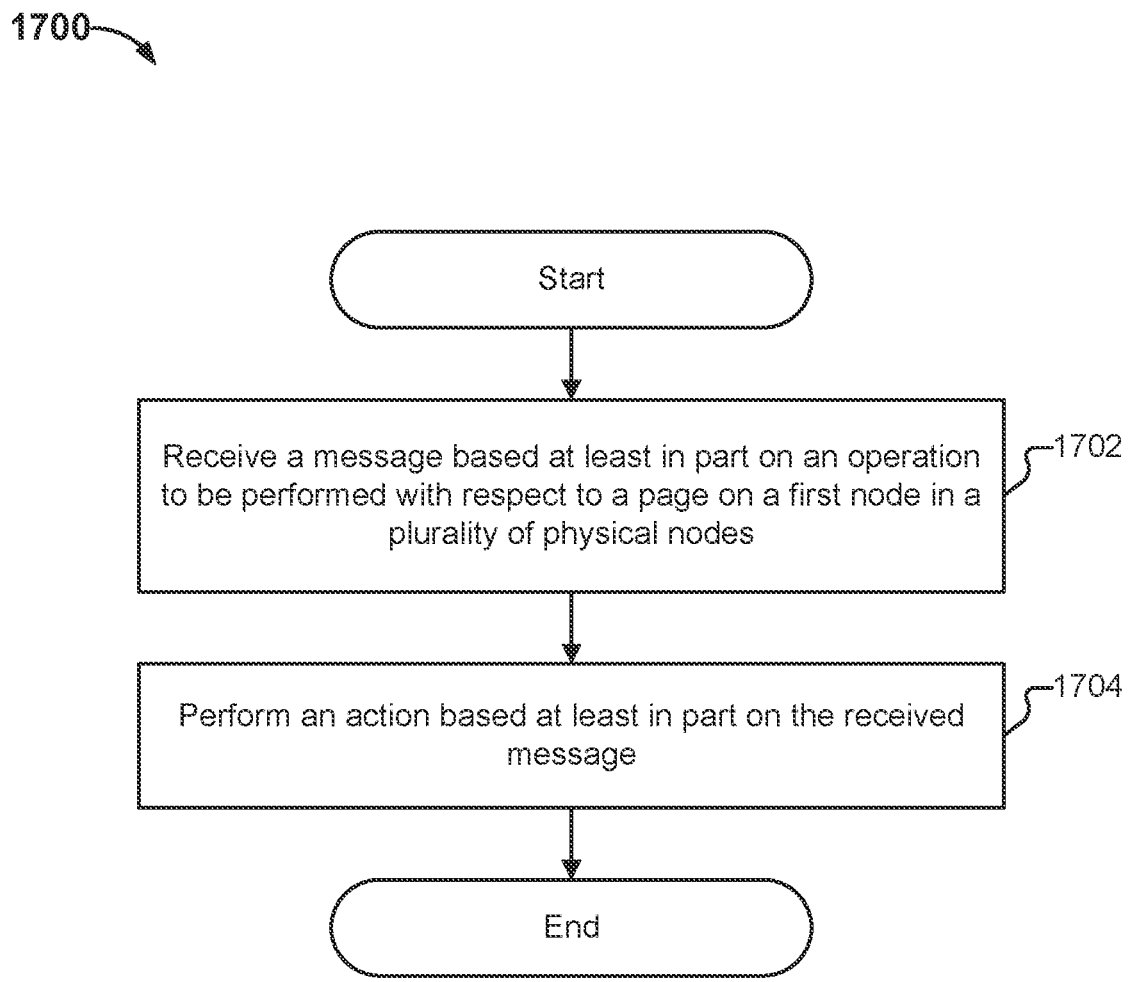
FIG. 17 is a flow diagram illustrating an embodiment of a process for maintaining cache coherency in the presence of a network attached memory.

FIG. 17 is a flow diagram illustrating an embodiment of a process for maintaining cache coherency in the presence of a network attached memory. In some embodiments, process 1700 is executed by a network attached memory such as network attached memory appliance 1306. In some embodiments, process 1700 is performed according to a cache coherency protocol such as that described above. The process begins at 1702, when a message is received at a network attached memory. The message is received based on an operation to be performed with respect to a page on a node (e.g., a TidalPod). In some embodiments, the node is included in a plurality of nodes with which the network attached memory communicates. In some embodiments, a virtual machine is created by a set of hyper-kernels running on each node in the TidalPod. An operating system may then be collectively run on the plurality of physical nodes. In some embodiments, the (guest) operating system is transparently run. For example, as described above, by using hyper-kernels, the operating system is given the impression that it is running on a bare metal piece of hardware (while being collectively run on a plurality of physical nodes as in a TidalPod), where modifications to the operating system need not be made.

As described above, in some embodiments, the network attached memory is organized as a physical array of bytes. In some embodiments, each byte of the array corresponds to a physical memory address in the virtual machine.

In some embodiments, the network attached memory is a centralized appliance. In other embodiments, the network attached memory is distributed across the nodes in the TidalPod. At 1704, an action is performed by the network attached memory based on the received message.

As described above, in various embodiments, operations that can be performed with respect to pages of memory on nodes include reads and writes (which may be local or remote). Based on the type of operation to be performed, different types of messages can be sent out.

For example, if the operation is a request to write into the page, invalidation requests (examples of messages at 1702) are sent to and received by other nodes as well as the network attached memory to invalidate their copies of the page to be written into. The network attached memory is configured to then invalidate its copy of the page. The network attached memory is also configured to return an acknowledgment indicating that its copy of the page is now invalid. The write operation can then proceed after receiving acknowledgments to the invalidation requests.

If the operation is, for example, a remote request from a node to read a page, the page (e.g., copy or snapshot of the page, where the message at 1702 includes the copy of the page) is sent to the requesting node as well as the network attached memory. The network attached memory is then updated with the copy of the page (e.g., the network attached memory stores the copy of the page at 1704).

Other examples of operations, actions, and page state transitions are described above in conjunction with Table 1.

Figure 18:
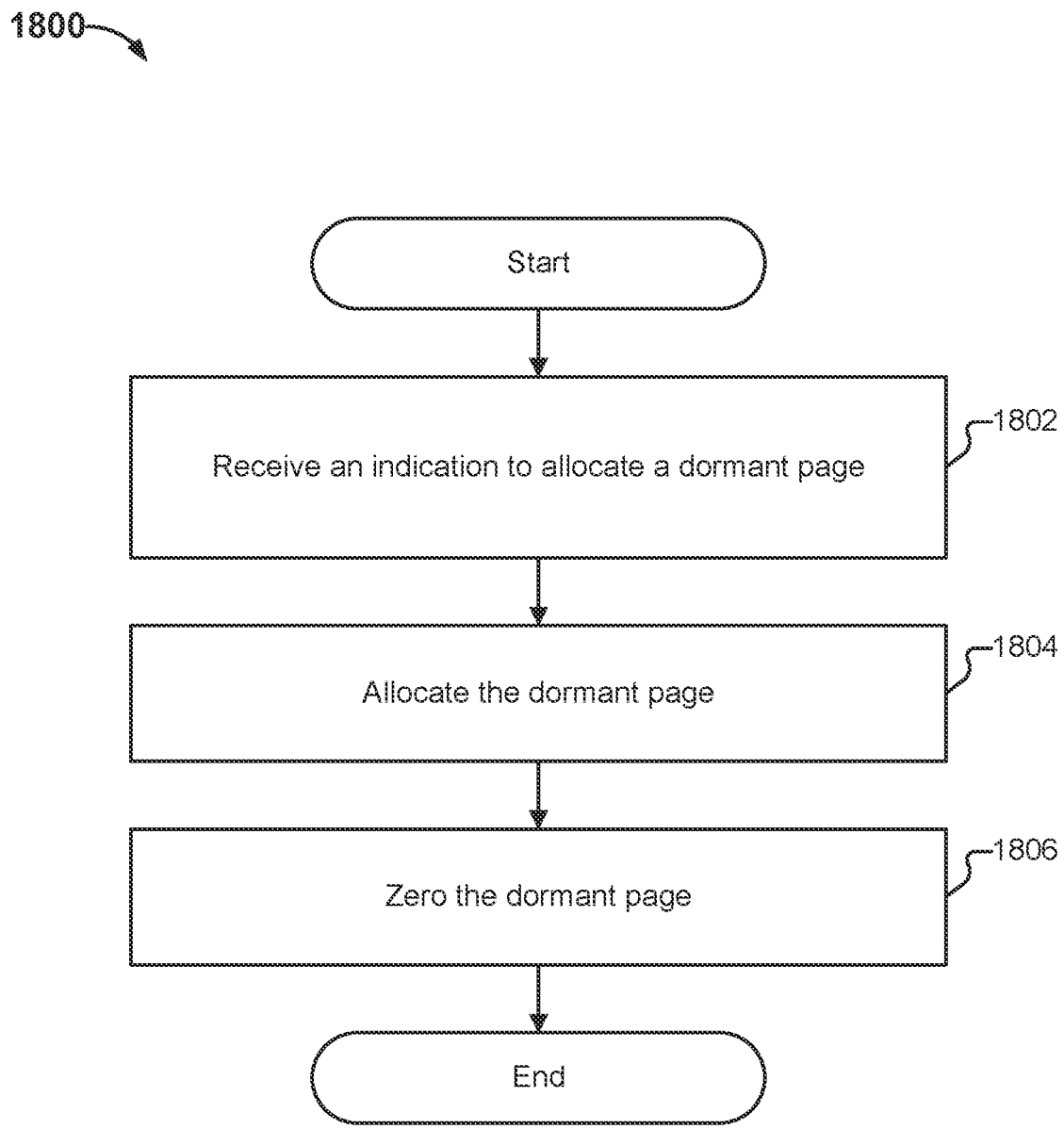
FIG. 18 is a flow diagram illustrating an embodiment of a process for zeroing pages.

FIG. 18 is a flow diagram illustrating an embodiment of a process for zeroing pages. In various embodiments, process 1800 is performed by a node and/or a network attached memory included in a TidalPod. The process begins at 1802 when an indication to allocate a dormant page is received. In some embodiments, a dormant page is a page of memory that has not yet been zeroed. In various embodiments, the page of memory includes a page in DRAM (e.g., on a node in a TidalPod), a page in a flash memory (e.g., non-volatile memory in a network attached memory), or any other appropriate page of memory. At 1804, the dormant page is allocated. At 1806, the allocated dormant page is then zeroed. In some embodiments, the zeroing of the dormant page is performed in parallel with the allocation of the dormant page. An entry may then be placed in a second level page table, where the page becomes valid and non-dormant. As described above, by using dormant pages (where pages can be tagged as dormant) performing zeroing after (or at the time of/in parallel with) allocation increases the boot up speed of a system, as the zeroing is not done at startup, but in a "lazy" fashion at the time that the page is used.

Described above are techniques for attaching a network-attached memory (e.g., flash appliance) to a tightly coupled cluster of nodes in which the total memory of the cluster represents the memory of a virtual machine supporting strong memory coherency. In some embodiments, as described above, the network-attached memory within the cluster is the reference memory of the virtual machine.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A computer system, comprising:
   a plurality of interconnected computing nodes, wherein a guest operating system is run on a virtual environment that is defined by a set of hyper-kernels running on at least a portion of the interconnected computing nodes;
   a persistent memory array separate from the plurality of interconnected computing nodes and separate from the virtual environment, wherein the persistent memory array communicates with at least some of the computing nodes over a network according to a coherency protocol;
   wherein, based at least in part on an operation to be performed with respect to a portion of memory on a first computing node included in the plurality of interconnected computing nodes, the persistent memory array receives, in accordance with the coherency protocol, a message, and wherein the portion of memory on the first computing node corresponds to a guest physical address in the virtual environment; and
   wherein the persistent memory array is configured to perform an action based at least in part on the coherency protocol and the received message.

2. The computer system of claim 1, wherein portions of the persistent memory array correspond to guest physical addresses in the virtual environment defined by the set of hyper-kernels running on the at least portion of the interconnected computing nodes.

3. The computer system of claim 1, wherein the operation to be performed with respect to the portion of memory on the first computing node comprises writing into the portion of memory.

4. The computer system of claim 3, wherein the message comprises an invalidation request.

5. The computer system of claim 4, wherein the action performed by the persistent memory array comprises invalidating a copy of the portion of memory stored on the persistent memory array.

6. The computer system of claim 5, wherein the persistent memory array is configured to return an acknowledgment indicating completion of the invalidation.

7. The computer system of claim 6, wherein the writing into the portion of memory is performed based at least in part on the returned acknowledgment.

8. The computer system of claim 1, wherein the operation to be performed with respect to the portion of memory on the first computing node comprises a read request for the portion of memory.

9. The computer system of claim 8, wherein the action performed by the persistent memory array comprises receiving a copy of the portion of memory.

10. The computer system of claim 1, wherein in response to detection of a failure, the persistent memory array is configured to request copies of one or more portions of memory from the computing nodes in the plurality of interconnected computing nodes.

11. The computer system of claim 10, wherein the one or more portions of memory for which copies are requested comprise portions of memory determined to be invalid on the persistent memory array.

12. The computer system of claim 11, wherein the persistent memory array is configured to update an invalid portion of memory with a corresponding obtained copy of a requested page.

13. The computer system of claim 1, wherein the persistent memory array comprises a centralized appliance.

14. The computer system of claim 1, wherein the persistent memory array includes at least one of flash memory, phase change memory, and 3D-Xpoint memory.

15. The computer system of claim 1, wherein the persistent memory array is configured to store a read-only copy of the portion of memory.

16. A method, comprising:
receiving, at a persistent memory array, a message, wherein the message is received in accordance with a coherency protocol, and wherein the message is received based at least in part on an operation to be performed with respect to a portion of memory on a first computing node in a plurality of interconnected computing nodes;
wherein a guest operating system is run on a virtual environment that is defined by a set of hyper-kernels running on at least a portion of the interconnected computing nodes, the persistent memory array is separate from the interconnected computing nodes, the persistent memory array is separate from the virtual environment, and wherein the persistent memory array communicates with at least some of the computing nodes over a network according to the coherency protocol; and
performing, by the persistent memory array, an action based at least in part on the coherency protocol and the received message.

17. A computer program product embodied in a non-transitory computer readable storage medium and comprising computer instructions for:
receiving, at a persistent memory array, a message, wherein the message is received in accordance with a coherency protocol, and wherein the message is received based at least in part on an operation to be performed with respect to a portion of memory on a first computing node in a plurality of interconnected computing nodes;
wherein a guest operating system is run on a virtual environment that is defined by a set of hyper-kernels running on at least a portion of the interconnected computing nodes, the persistent memory array is separate from the interconnected computing nodes, the persistent memory array is separate from the virtual environment, and wherein the persistent memory array communicates with at least some of the computing nodes over a network according to the coherency protocol; and
performing, by the persistent memory array, an action based at least in part on the coherency protocol and the received message.

* * * * *